US012812014B2

(12) United States Patent
Lu et al.

(10) Patent No.: US 12,812,014 B2
(45) Date of Patent: Nov. 24, 2026

(54) METHOD AND APPARATUS FOR SUBSCRIPTION MANAGEMENT

(71) Applicant: Telefonaktiebolaget LM Ericsson (publ), Stockholm (SE)

(72) Inventors: Yunjie Lu, Shanghai (CN); Cheng Wang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 19/126,659

(22) PCT Filed: Nov. 1, 2023

(86) PCT No.: PCT/CN2023/129000
§ 371 (c)(1),
(2) Date: May 2, 2025

(87) PCT Pub. No.: WO2024/094049
PCT Pub. Date: May 10, 2024

(65) Prior Publication Data

US 2026/0163955 A1 Jun. 11, 2026

(30) Foreign Application Priority Data

Nov. 2, 2022 (WO) ................ PCT/CN2022/129304

(51) Int. Cl.
*H04L 67/51* (2022.01)

(52) U.S. Cl.
CPC .................................... *H04L 67/51* (2022.05)

(58) Field of Classification Search
None
See application file for complete search history.

(56) References Cited

U.S. PATENT DOCUMENTS

2019/0313212 A1 10/2019 Lee et al.

FOREIGN PATENT DOCUMENTS

| | | | | |
|---|---|---|---|---|
| CN | 117978673 A * | 5/2024 | ............. | H04W 8/18 |
| EP | 4307741 A1 | 1/2024 | | |
| EP | 4156624 B1 * | 4/2025 | ............ | H04L 67/51 |

OTHER PUBLICATIONS

International Search Report and Written Opinion of the International Searching Authority, PCT/CN2023/129000, mailed May 17, 2024, 29 pages.

(Continued)

*Primary Examiner* — G. C. Neurauter, Jr.
(74) *Attorney, Agent, or Firm* — Sage Patent Group

(57) ABSTRACT

Embodiments of the present disclosure provide method and apparatus for subscription management. A method performed by a first NF comprises receiving a first subscribe request for subscribing to at least one event type from a second NF. The first subscribe request requests the first NF to send an event notification of the at least one event type to a third NF. The method further comprises detecting an occurrence of at least one monitored event of the at least one event type. The method further comprises sending an event notification of the at least one monitored event of the at least one event type to the third NF. The method further comprises receiving an event notification response comprising error information from the third NF. The method further comprises sending a first message comprising an event subscription termination notification of the at least one event type to the second NF.

20 Claims, 11 Drawing Sheets

(56) References Cited

OTHER PUBLICATIONS

3rd Generation Partnership Project; Technical Specification Group Services and System Aspects; System architecture for the 5G System (5GS); Stage 2 (Release 17) 3GPP TS 23.501 V17.6.0 (Sep. 2022) (XP052272936) 571 pages.
3rd Generation Partnership Project; Technical Specification Group Core Network and Terminals; 5G System; Access and Mobility Management Services; Stage 3 (Release 17) 3GPP TS 29.518 V17.7.0 (Sep. 2022) (XP052273106) 416 pages.
Ericsson, "EE Subscription Notification Error Handling," 3GPP TSG-CT WG4 Meeting #111-e, C4-224489, E-Meeting, Aug. 18-26, 2022, 7 pages.
Ericsson, "Event Subscription Termination Notification," 3GPP TSG-CT WG4 Meeting #113, C4-225226, Tolouse, France, Nov. 14-18, 2022, 16 pages.
Ericsson, "Event Subscription Termination Notification," 3GPP TSG-CT WG4 Meeting #113, C4-225462, Tolouse, France, Nov. 14-18, 2022, 22 pages.
Ericsson, "Event Subscription Termination Notification," 3GPP TSG-CT WG4 Meeting #113, C4-225637, Tolouse, France, Nov. 14-18, 2022, 22 pages.
Nokia, Nokia Shanghai Bell, "Event subscription not authorized by the target AMF," 3GPP TSG-CT WG4 Meeting #118, C4-234096, Xiamen, P.R. China; Oct. 9-13, 2023, 15 pages.
Ericsson, "Notification for AMF Event Subscription Termination due to Invalid Access Token," 3GPP TSG-CT WG4 Meeting #118, C4-234290, Xiamen, P.R. China; Oct. 9-13, 2023, 11 pages.
Nokia, Nokia Shanghai Bell, Ericsson "Event subscription not authorized by the target AMF," 3GPP TSG-CT WG4 Meeting #118, 234452, Xiamen, P.R. China; Oct. 9-13, 2023, 15 pages.

* cited by examiner

METHOD AND APPARATUS FOR SUBSCRIPTION MANAGEMENT

CROSS REFERENCE TO RELATED APPLICATIONS

This application is a 35 U.S.C. § 371 national stage application of PCT International Application No. PCT/CN2023/129000 filed on Nov. 1, 2023, which in turn claims foreign priority to International Patent Application No. PCT/CN2022/129304, filed with the Chinese Patent Office on Nov. 2, 2022, the disclosures and content of each of which are incorporated by reference herein in their entirety.

TECHNICAL FIELD

The non-limiting and exemplary embodiments of the present disclosure generally relate to the technical field of communications, and specifically to methods and apparatuses for subscription management.

BACKGROUND

This section introduces aspects that may facilitate a better understanding of the disclosure. Accordingly, the statements of this section are to be read in this light and are not to be understood as admissions about what is in the prior art or what is not in the prior art.

In a network, the end-to-end interaction between two network functions (NF Service consumer and NF Service producer) within an NF service framework may follow two mechanisms, irrespective of whether direct communication or indirect communication is used: "Request-response" and "Subscribe-Notify".

The "Subscribe-Notify" mechanisms are described in Third Generation Partnership Project (3GPP) Technical Specification (TS)23.501 V17.5.0 as following, the disclosure of which is incorporated by reference herein in its entirety.

"Subscribe-Notify": A NF_A (NF service consumer) subscribes to NF Service offered by another NF_B (NF Service Producer). Multiple Control Plane NFs may subscribe to the same Control Plane NF Service. NF_B notifies the results of this NF service to the interested NF(s) that subscribed to this NF service. The subscription request shall include the notification endpoint, i.e. Notification Target Address) and a Notification Correlation ID (identifier) (e.g. the notification URL) of the NF service consumer to which the event notification from the NF Service Producer should be sent to.

The notification endpoint URL can contain both the notification endpoint and the Notification Correlation ID.

The subscription request may include notification request for periodic updates or notification triggered through certain events (e.g. the information requested gets changed, reaches certain threshold etc.). The subscription for notification can be done through one of the following ways:

- Explicit subscription: A separate request/response exchange between the NF service consumer and the NF Service Producer; or
- Implicit subscription: The subscription for notification is included as part of another NF service operation of the same NF Service; or
- Default notification endpoint: Registration of a notification endpoint for each type of notification the NF consumer is interested to receive, as a NF service parameter with the NRF during the NF and NF service Registration procedure as specified in clause 4.17.1 of 3GPP TS 23.502 V17.5.0, the disclosure of which is incorporated by reference herein in its entirety.

FIG. 1*a* shows a flowchart of a first example of "Subscribe-Notify" NF Service, which is same as FIG. 7.1.2-2 of 3GPP TS 23.501 V17.5.0.

An NF_A may subscribe to NF Service offered by an NF_B by sending a subscribe request to the NF_B. The NF_B may acknowledge the execution of subscribe request. The NF_B detects a monitored event occurs and sends an event report by means of a notify message, to the NF_A.

FIG. 1*b* shows a flowchart of a second example of "Subscribe-Notify" NF Service, which is same as FIG. 7.1.2-3 of 3GPP TS 23.501 V17.5.0

A NF_A may also subscribe to NF Service offered by NF_B on behalf of NF_C, i.e. it requests the NF Service Producer to send the event notification to another consumer(s). In this case, NF_A includes the notification endpoint, i.e. Notification Target Address) and a Notification Correlation ID, of the NF_C in the subscription request. NF_A may also additionally include the notification endpoint and a Notification Correlation ID of NF_A associated with subscription change related Event ID(s), e.g. Subscription Correlation ID Change, in the subscription request, so that NF_A can receive the notification of the subscription change related event.

Security handling of service operation as Subscribe-Notify may follows security principle such as Service Based Architecture (SBA) security principle. That is NF_B as producer may validate whether the NF_A is authorized to use this Subscribe-Notify service operation.

In some cases, subscription for a certain event that is created for a user equipment (UE) can be stored in the UE context in a serving NF e.g. AMF (Access and Mobility Management Function). In case of UE mobility, this subscription can be moved from the source NF to a target NF together with UE context transferring procedure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

There are some problems for the existing "Subscribe-Notify" mechanism.

For example, an NF producer such as AMF may identify a subscription is no longer valid and terminate the subscription, when the NF such as AMF received certain response code on the notification uniform resource identifier (URI).

However when such an event subscription was subscribed by a NF consumer on behalf of another NF handling the notification (e.g., UDM (Unified Data Management) on behalf of NEF (Network Exposure Function)), the NF producer such as AMF does not inform the subscription requester that the subscription is terminated at the NF producer such as AMF. The Subscription requester cannot trigger some local cleanup for the invalid subscription based on the notification.

Additionally, an event subscription may be terminated by the NF producer such as AMF in other scenarios, e.g., after inter-PLMN (public land mobile network) mobility, service authorization on the event subscription created at a source NF producer such as AMF of a source PLMN is no longer valid in a target NF producer such as AMF of a target PLMN. However in such scenarios the target NF producer such as AMF also does not send a notification to the subscription requester about subscription termination, with cause IE (information element) indicating the reason. Thereby, the subscription requester can not trigger some necessary actions based on the notification.

For example, when an event subscription was subscribed by a NF consumer (NF_A) on behalf of another NF (NF_C) handling the notification (e.g., UDM as NF_A on behalf of NEF as NF_C), the original event subscription maybe locally removed or no longer valid at the original NF consumer (NF_C) but not successfully un-subscribed in the producer (e.g. AMF as NF_B).

In such a case, the AMF may deliver the notification to NF_C and receives some errors codes (e.g. 404 Not Found) from NF-C. Based on such Notification error, the AMF can trigger proper actions, e.g. cleanup the resources reserved for Subscribe-Notify.

However, the NF_A which requested the Subscribe-Notify towards NF_B does not receive any indication thereby would yet consume resources to maintain the subscription, which unnecessarily waste the resource usage.

In another case, an event subscription may move from a NF producer (NF_B_1) called source NF to another NF producer (NF_B_1) call target NF, e.g., after inter-PLMN mobility. The service operation authorization policy for the event subscription in the source NF and target NF can be different. That is, service authorization on the event subscription created at source AMF/PLMN is no longer valid in target AMF/PLMN.

Similarly, the NF_A which requested the Subscribe-Notify towards NF_B was not aware of such cases thereby would yet consume resources to maintain the subscription, which unnecessarily waste the resource usage.

Subscription terminated by NF such as AMF cannot be informed to the subscription requester. The NF consumer cannot receive event reports as expected. The NF consumer may try to update the subscription and got rejected with negative KPI (Key Performance Indicator) influence.

To overcome or mitigate at least one of above mentioned problems or other problems, the embodiments of the present disclosure propose an improved solution for subscription management.

In a first aspect of the disclosure, there is provided a method performed by a first network function (NF). The method comprises receiving a first subscribe request for subscribing to at least one event type from a second NF. The first subscribe request requests the first NF to send an event notification of the at least one event type to a third NF. The method further comprises detecting an occurrence of at least one monitored event of the at least one event type. The method further comprises sending an event notification of the at least one monitored event of the at least one event type to the third NF. The method further comprises receiving an event notification response comprising error information from the third NF. The method further comprises sending a first message comprising an event subscription termination notification of the at least one event type to the second NF.

In an embodiment, the method further comprises terminating a subscription of the at least one event type. The method further comprises cleaning up at least one resource reserved for the subscription of the at least one event type.

In an embodiment, the first message further comprises a reason code.

In an embodiment, the reason code indicates that a subscription of the at least one event type is terminated because the first NF has identified that the subscription of the at least one event type is no longer valid on the third NF hosting a notification uniform resource identifier (URI).

In an embodiment, the first NF comprises at least one of an access and mobility management function (AMF), or a session management function (SMF).

In an embodiment, the second NF comprises a unified data management (UDM).

In an embodiment, the third NF comprises a network exposure function (NEF).

In a second aspect of the disclosure, there is provided a method performed by a second NF. The method comprises receiving a second subscribe request for subscribing to at least one event type from a third NF. The method further comprises sending a first subscribe request for subscribing to the at least one event type to a first NF on behave of the third NF. The first subscribe request requests the first NF to send an event notification of the at least one event type to the third NF. The method further comprises receiving a first message comprising an event subscription termination notification of the at least one event type from the first NF. The method further comprises cleaning up at least one resource reserved for a subscription of the at least one event type.

In an embodiment, the first message further comprises a reason code.

In an embodiment, the reason code indicates that a subscription of the at least one event type is terminated because the first NF has identified that the subscription of the at least one event type is no longer valid on the third NF hosting a notification uniform resource identifier (URI).

In an embodiment, the first NF comprises at least one of an access and mobility management function (AMF), or a session management function (SMF).

In an embodiment, the second NF comprises a unified data management (UDM).

In an embodiment, the third NF comprises a network exposure function (NEF).

In a third aspect of the disclosure, there is provided a method performed by a third network function (NF). The method comprises sending a second subscribe request for subscribing to at least one event type to a second NF. The method further comprises receiving an event notification of at least one monitored event of the at least one event type from a first NF. The method further comprises determining a subscription of the at least one event type is removed or no longer valid at the third NF. The method further comprises sending an event notification response comprising error information to the first NF.

In an embodiment, the method further, when the subscription of the at least one event type is no longer valid at the third NF, cleaning up at least one resource reserved for the subscription of the at least one event type.

In an embodiment, the first NF comprises at least one of an access and mobility management function (AMF), or a session management function (SMF).

In an embodiment, the second NF comprises a unified data management (UDM).

In an embodiment, the third NF comprises a network exposure function (NEF).

In a fourth aspect of the disclosure, there is provided a method performed by a fourth network function (NF). The method comprises receiving a subscription of at least one event type requested by a fifth NF from a sixth NF. The method further comprises checking whether the fourth NF supports the at least one event type and/or whether the subscription of the at least one event type requested by the fifth NF is authorized. The method further comprises, when the fourth NF does not support the at least one event type and/or the subscription of the at least one event type requested by the fifth NF is not authorized, sending a second message comprising an event subscription termination notification of the at least one event type to the fifth NF.

In an embodiment, when the fourth NF does not support the at least one event type and/or the subscription of the at least one event type requested by the fifth NF is not authorized, the method further comprises terminating the subscription of the at least one event type. The method further comprises cleaning up at least one resource reserved for the subscription of the at least one event type.

In an embodiment, the second message further comprises a reason code.

In an embodiment, the reason code indicates at least one of the subscription of the at least one event type is terminated because a service access authorization to the fifth NF is no longer valid, the subscription of the at least one event type is terminated because the fourth NF requires a new service authorization, or the subscription of the at least one event type is terminated because the at least one event type is not supported in the fourth NF.

In an embodiment, the subscription of the at least one event type requested by the fifth NF is received from the sixth NF during an inter public land mobile network (PLMN) mobility procedure or a terminal device mobility procedure.

In an embodiment, the fourth NF comprises at least one of an access and mobility management function (AMF), or a session management function (SMF).

In an embodiment, the fifth NF comprises at least one of a unified data management (UDM), or a network exposure function (NEF).

In an embodiment, the sixth NF comprises at least one of an access and mobility management function (AMF), or a session management function (SMF).

In a fifth aspect of the disclosure, there is provided a method performed by a fifth network function (NF). The method comprises, when a subscription of at least one event type requested by the fifth NF is sent from a sixth NF to a fourth NF and the fourth NF does not support the at least one event type and/or the subscription of the at least one event type requested by the fifth NF is not authorized, receiving a second message comprising an event subscription termination notification of the at least one event type from the fourth NF. The method further comprises cleaning up at least one resource reserved for the subscription of the at least one event type.

In an embodiment, the second message further comprises a reason code.

In an embodiment, the reason code indicates at least one of the subscription of the at least one event type is terminated because a service access authorization to the fifth NF is no longer valid, the subscription of the at least one event type is terminated because the fourth NF requires a new service authorization, or the subscription of the at least one event type is terminated because the at least one event type is not supported in the fourth NF.

In an embodiment, the subscription of the at least one event type requested by the fifth NF is sent from the sixth NF to the fourth NF during an inter public land mobile network (PLMN) mobility procedure or a terminal device mobility procedure.

In an embodiment, the method further comprises obtaining an access authorization token for the fourth NF based on the second message.

In an embodiment, the method further comprises sending a new subscribe request for subscribing to one or more event types to the fourth NF based on the second message. The new subscribe request comprises the access authorization token for the fourth NF.

In an embodiment, the fourth NF comprises at least one of an access and mobility management function (AMF), or a session management function (SMF).

In an embodiment, the fifth NF comprises at least one of a unified data management (UDM), or a network exposure function (NEF).

In an embodiment, the sixth NF comprises at least one of an access and mobility management function (AMF), or a session management function (SMF).

In a sixth aspect of the disclosure, there is provided a first NF. The first NF comprises a processor and a memory coupled to the processor. Said memory contains instructions executable by said processor. Said first NF is operative to receive a first subscribe request for subscribing to at least one event type from a second NF. The first subscribe request requests the first NF to send an event notification of the at least one event type to a third NF. Said first NF is further operative to detect an occurrence of at least one monitored event of the at least one event type. Said first NF is further operative to send an event notification of the at least one monitored event of the at least one event type to the third NF. Said first NF is further operative to receive an event notification response comprising error information from the third NF. Said first NF is further operative to send a first message comprising an event subscription termination notification of the at least one event type to the second NF.

In a seventh aspect of the disclosure, there is provided a second NF. The second NF comprises a processor and a memory coupled to the processor. Said memory contains instructions executable by said processor. Said second NF is operative to receive a second subscribe request for subscribing to at least one event type from a third NF. Said second NF is further operative to send a first subscribe request for subscribing to the at least one event type to a first NF on behave of the third NF. The first subscribe request requests the first NF to send an event notification of the at least one event type to the third NF. Said second NF is further operative to receive a first message comprising an event subscription termination notification of the at least one event type from the first NF. Said second NF is further operative to clean up at least one resource reserved for a subscription of the at least one event type.

In an eighth aspect of the disclosure, there is provided a third NF. The third NF comprises a processor and a memory coupled to the processor. Said memory contains instructions executable by said processor. Said third NF is operative to send a second subscribe request for subscribing to at least one event type to a second NF. Said third NF is further operative to receive an event notification of at least one monitored event of the at least one event type from a first NF. Said third NF is further operative to determine a subscription of the at least one event type is removed or no longer valid at the third NF. Said third NF is further operative to send an event notification response comprising error information to the first NF.

In a ninth aspect of the disclosure, there is provided a fourth NF. The fourth NF comprises a processor and a memory coupled to the processor. Said memory contains instructions executable by said processor. Said fourth NF is operative to receive a subscription of at least one event type requested by a fifth NF from a sixth NF. Said fourth NF is further operative to receive check whether the fourth NF supports the at least one event type and/or whether the subscription of the at least one event type requested by the fifth NF is authorized. Said fourth NF is further operative to, when the fourth NF does not support the at least one event type and/or the subscription of the at least one event type requested by the fifth NF is not authorized, send a second message comprising an event subscription termination notification of the at least one event type to the fifth NF.

In a tenth aspect of the disclosure, there is provided a fifth NF. The fifth NF comprises a processor and a memory coupled to the processor. Said memory contains instructions executable by said processor. Said fifth NF is operative to, when a subscription of at least one event type requested by the fifth NF is sent from a sixth NF to a fourth NF and the fourth NF does not support the at least one event type and/or the subscription of the at least one event type requested by the fifth NF is not authorized, receiving a second message comprising an event subscription termination notification of the at least one event type from the fourth NF. Said fifth NF is further operative to clean up at least one resource reserved for the subscription of the at least one event type.

In another aspect of the disclosure, there is provided a first NF. The first NF comprises a first receiving module configured to receive a first subscribe request for subscribing to at least one event type from a second NF. The first subscribe request requests the first NF to send an event notification of the at least one event type to a third NF. The first NF further comprises a detecting module configured to detect an occurrence of at least one monitored event of the at least one event type. The first NF further comprises a first sending module configured to send an event notification of the at least one monitored event of the at least one event type to the third NF. The first NF further comprises a second receiving module configured to receive an event notification response comprising error information from the third NF. The first NF further comprises a second sending module configured to send a first message comprising an event subscription termination notification of the at least one event type to the second NF.

In an embodiment, the first NF further comprises a terminating module configured to terminate a subscription of the at least one event type.

In an embodiment, the first NF further comprises a cleaning module configured to clean up at least one resource reserved for the subscription of the at least one event type.

In another aspect of the disclosure, there is provided a second NF. The second NF comprises a first receiving module configured to receive a second subscribe request for subscribing to at least one event type from a third NF. The second NF further comprises a sending module configured to send a first subscribe request for subscribing to the at least one event type to a first NF on behave of the third NF. The first subscribe request requests the first NF to send an event notification of the at least one event type to the third NF. The second NF further comprises a second receiving module configured to receive a first message comprising an event subscription termination notification of the at least one event type from the first NF. The second NF further comprises a cleaning module configured to clean up at least one resource reserved for a subscription of the at least one event type.

In another aspect of the disclosure, there is provided a third NF. The third NF comprises a first sending module configured to send a second subscribe request for subscribing to at least one event type to a second NF. The third NF further comprises a receiving module configured to receive an event notification of at least one monitored event of the at least one event type from a first NF. The third NF further comprises a determining module configured to determine a subscription of the at least one event type is removed or no longer valid at the third NF. The third NF further comprises a second sending module configured to send an event notification response comprising error information to the first NF.

In an embodiment, the third NF further comprises a cleaning module configured to, when the subscription of the at least one event type is no longer valid at the third NF, clean up at least one resource reserved for the subscription of the at least one event type.

In another aspect of the disclosure, there is provided a fourth NF. The fourth NF comprises a receiving module configured to receive a subscription of at least one event type requested by a fifth NF from a sixth NF. The fourth NF further comprises a checking module configured to check whether the fourth NF supports the at least one event type and/or whether the subscription of the at least one event type requested by the fifth NF is authorized. The fourth NF further comprises a sending module configured to, when the fourth NF does not support the at least one event type and/or the subscription of the at least one event type requested by the fifth NF is not authorized, send a second message comprising an event subscription termination notification of the at least one event type to the fifth NF.

In an embodiment, the fourth NF further comprises a terminating module configured to, when the fourth NF does not support the at least one event type and/or the subscription of the at least one event type requested by the fifth NF is not authorized, terminate the subscription of the at least one event type. The fourth NF further comprises a cleaning module configured to clean up at least one resource reserved for the subscription of the at least one event type.

In another aspect of the disclosure, there is provided a fifth NF. The fifth NF comprises a receiving module configured to, when a subscription of at least one event type requested by the fifth NF is sent from a sixth NF to a fourth NF and the fourth NF does not support the at least one event type and/or the subscription of the at least one event type requested by the fifth NF is not authorized, receive a second message comprising an event subscription termination notification of the at least one event type from the fourth NF. The fifth NF further comprises a cleaning module configured to clean up at least one resource reserved for the subscription of the at least one event type.

In an embodiment, the fifth NF further comprises an obtaining module configured to obtain an access authorization token for the fourth NF based on the second message.

In an embodiment, the fifth NF further comprises a sending module configured to send a new subscribe request for subscribing to one or more event types to the fourth NF based on the second message. The new subscribe request comprises the access authorization token for the fourth NF.

In another aspect of the disclosure, there is provided a computer program product comprising instructions which when executed by at least one processor, cause the at least one processor to perform the method according to any one of the first, second, third, fourth or fifth aspect.

In another aspect of the disclosure, there is provided a computer-readable storage medium storing instructions which when executed by at least one processor, cause the at least one processor to perform the method according to any one of the first, second, third, fourth or fifth aspect.

Embodiments herein may provide many advantages, of which a non-exhaustive list of examples follows. In some embodiments herein, based on the new Event Subscription Termination Notification, subscription requester can trigger local cleanup for the invalid subscription so as to avoid unnecessary waste of the resource usage or trigger other necessary actions to ensure service proceeding. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
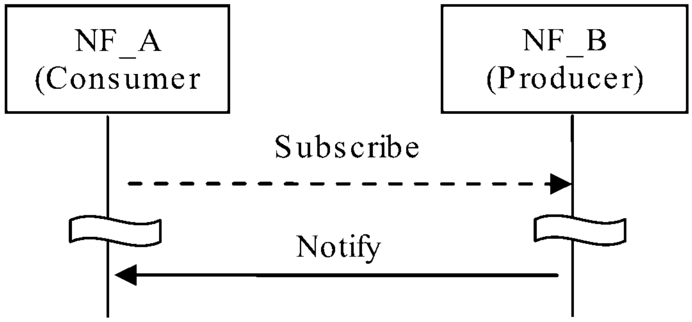
FIG. 1*a* shows a flowchart of a first example of "Subscribe-Notify" NF Service.
Figure 1B:
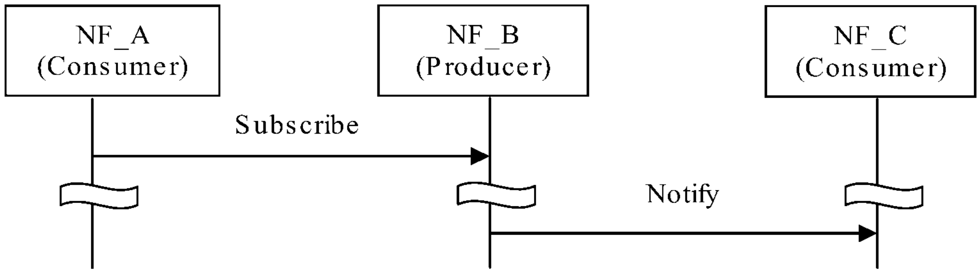
FIG. 1*b* shows a flowchart of a second example of "Subscribe-Notify" NF Service.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the first generation (1G), 2G, 3G, 4G, 4.5G, 5G communication protocols, and/or any other protocols either currently known or to be developed in the future.

The term "network device" or "network node" refers to any suitable network function (NF) which can be implemented in a network entity (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure. For example, the 5G system (5GS) may comprise a plurality of NFs such as AMF (Access and Mobility Management Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), NWDAF (network data analytics function), NSSF (Network Slice Selection Function), NSSAAF (Network Slice-Specific Authentication and Authorization Function), etc. For example, the 4G system (such as LTE (Long Term Evolution)) may include MME (Mobile Management Entity), HSS (home subscriber server), Policy and Charging Rules Function (PCRF), Packet Data Network Gateway (PGW), PGW control plane (PGW-C), Serving gateway (SGW), SGW control plane (SGW-C), E-UTRAN Node B (eNB), etc. In other embodiments, the network function may comprise different types of NFs for example depending on a specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP (3rd Generation Partnership Project), such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 2:
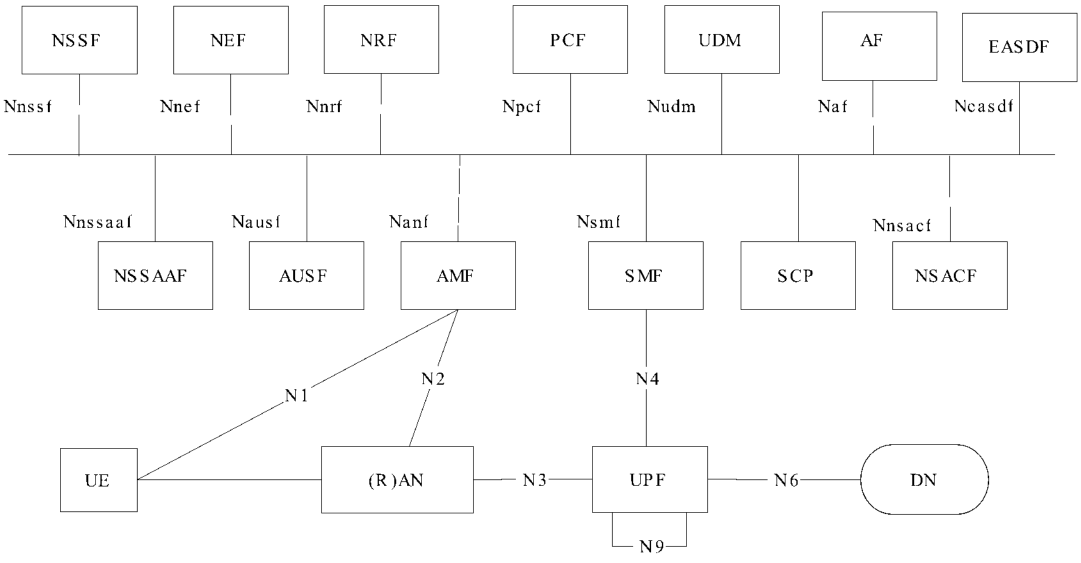
FIG. 2 schematically shows a high level architecture in the fifth generation network according to an embodiment of the present disclosure.

Although the subject matter described herein may be implemented in any appropriate type of system using any suitable components, the embodiments disclosed herein are described in relation to a communication system complied with the exemplary system architecture illustrated in FIG. 2. For simplicity, the system architecture of FIG. 2 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 2 schematically shows a high level architecture in the fifth generation network according to an embodiment of the present disclosure. For example, the fifth generation network may be 5GS. The architecture of FIG. 2 is same as FIG. 4.2.3-1 as described in 3GPP TS 23.501 V17.5.0, the disclosure of which is incorporated by reference herein in its entirety. The system architecture of FIG. 2 may comprise some exemplary elements such as AUSF, AMF, DN (data network), NEF, NRF, NSSF, PCF, SMF, UDM, UPF, AF, UE, (R)AN, SCP (Service Communication Proxy), NSSAAF (Network Slice-Specific Authentication and Authorization Function), NSACF (Network Slice Admission Control Function), Edge Application Server Discovery Function (EASDF), etc.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a protocol data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf, Nnsacf, Neasdf and Nsmf exhibited by NFs such as the NRF, the NEF, the AUSF, the UDM, the PCF, the AMF, the NSACF, the EASDF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, security, etc. The AUSF, AMF, DN, NEF, NRF, NSSF, PCF, SMF, UDM, UPF, AF, UE, (R)AN, SCP, NSACF, EASDF may include the functionality for example as defined in clause 6.2 of 3GPP TS 23.501 V17.5.0.

Figure 3A:
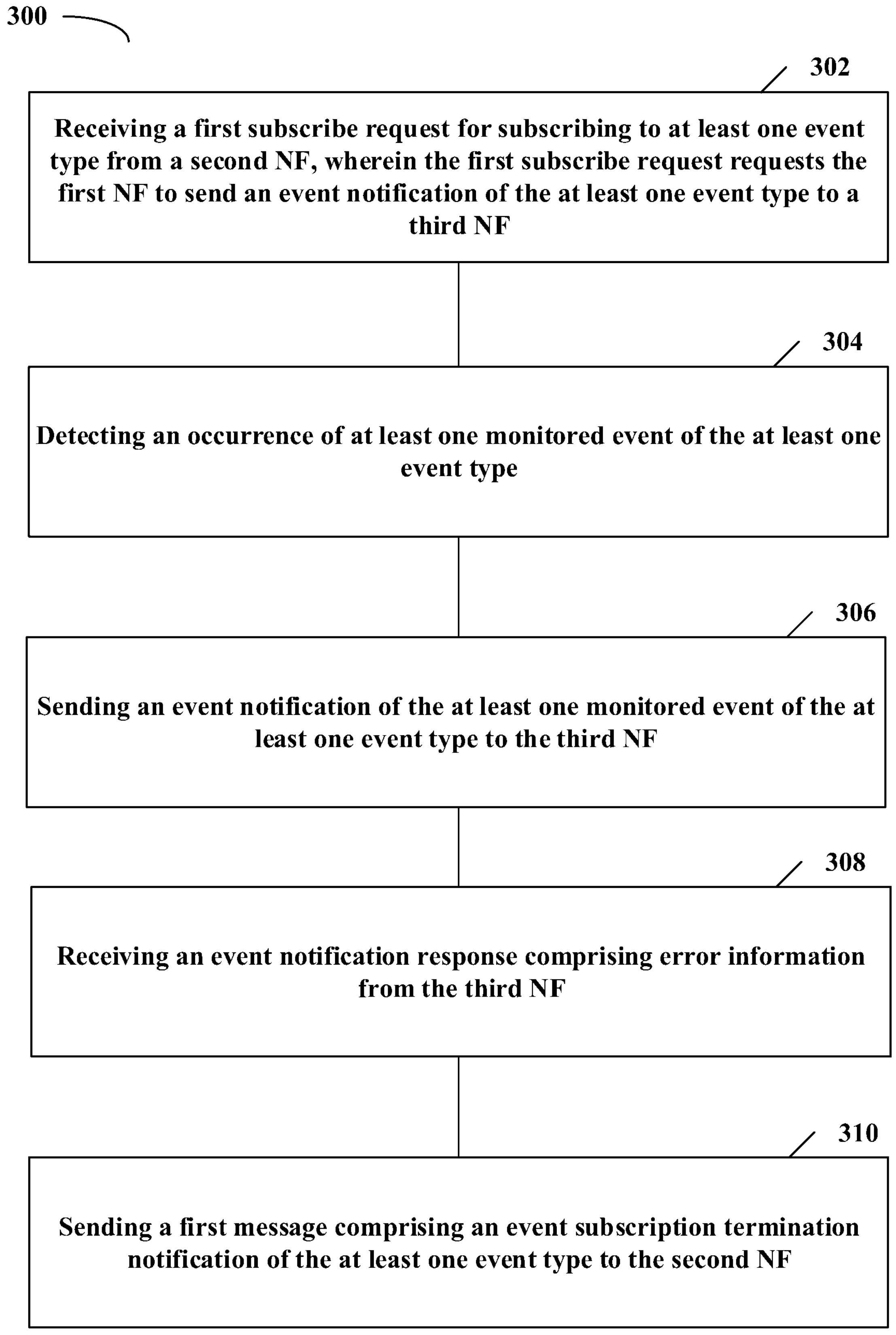
FIG. 3*a* shows a flowchart of a method according to an embodiment of the present disclosure.

FIG. 3*a* shows a flowchart of a method according to an embodiment of the present disclosure, which may be performed by an apparatus implemented in or at or as a first network function (NF) or communicatively coupled to the first NF. As such, the apparatus may provide means or modules for accomplishing various parts of the method 300 as well as means or modules for accomplishing other processes in conjunction with other components.

At block 302, the first NF may receive a first subscribe request for subscribing to at least one event type from a second NF. The first subscribe request requests the first NF to send an event notification of the at least one event type to a third NF.

The first NF may be any suitable network device or node or entity or function. For example, the first NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the first NF may comprise at least one of an access and mobility management function (AMF), or a session management function (SMF).

The second NF may be any suitable network device or node or entity or function. For example, the second NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the second NF may comprise a unified data management (UDM).

The third NF may be any suitable network device or node or entity or function. For example, the third NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the third NF may comprise a network exposure function (NEF).

For example, the second NF may receive a second subscribe request for subscribing to at least one event type from the third NF and send the first subscribe request for subscribing to the at least one event type to the first NF on behave of the third NF.

The first subscribe request may be any suitable subscribe request such as exiting subscribe request or new subscribe request.

In an embodiment, the first subscribe request may be the subscribe request as described in 3GPP TS 23.502 V17.5.0. For example, the first subscribe request may be Namf_EventExposure_Subscribe request or Nsmf_EventExposure_Subscribe request as described in 3GPP TS 23.502 V17.5.0.

The at least one event type may be any suitable event type and the present disclosure has no limit on it. In an embodiment, the at least one event type may be same as the event type as described in various 3GPP specifications such as 3GPP TS 23.502 V17.5.0. For example, the at least one event type may comprise PDU Session Release, UE mobility out of an Area of Interest, etc.

The first subscribe request may comprise any suitable information. For example, the first subscribe request may comprise the notification endpoint of the third NF and the notification endpoint of the second NF. Each notification endpoint may be associated with the related (set of) Event ID(s). This is to assure the second NF can receive the notification of subscription change related event.

At block 304, the first NF may detect an occurrence of at least one monitored event of the at least one event type.

At block 306, the first NF may send an event notification of the at least one monitored event of the at least one event type to the third NF.

At block 308, the first NF may receive an event notification response comprising error information from the third NF.

The error information may be any suitable error information. For example, when the third NF determines the subscription of the at least one event type is removed or no longer valid at the third NF or cannot be found at the third NF, the third NF may send the event notification response comprising error information to the first NF. The error information may indicate the specific error, e.g., the subscription of the at least one event type is removed or no longer valid at the third NF or cannot be found at the third NF.

At block 310, the first NF may send a first message comprising an event subscription termination notification of the at least one event type to the second NF.

The first message may be any suitable message such as existing message or new message.

The event subscription termination notification may be any suitable form such as a bit, a flag, an indication, etc.

In an embodiment, the first message further comprises a reason code. The reason code may be any suitable form such as a bit, a flag, an indication, etc.

In an embodiment, the reason code indicates that a subscription of the at least one event type is terminated because the first NF has identified that the subscription of the at least one event type is no longer valid on the third NF hosting a notification uniform resource identifier (URI).

Figure 3B:
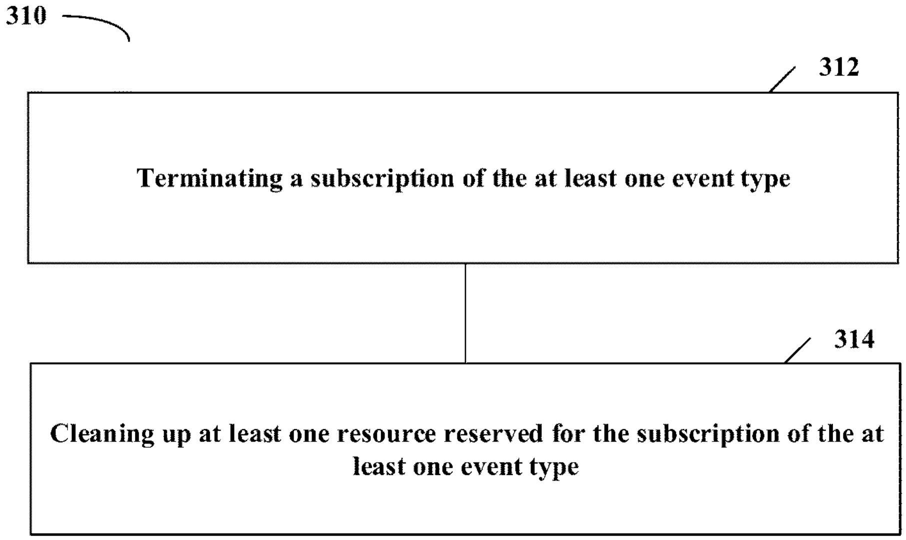
FIG. 3*b* shows a flowchart of a method according to another embodiment of the present disclosure.

FIG. 3*b* shows a flowchart of a method according to another embodiment of the present disclosure, which may be performed by an apparatus implemented in or at or as a first network function (NF) or communicatively coupled to the first NF. As such, the apparatus may provide means or modules for accomplishing various parts of the method 310 as well as means or modules for accomplishing other processes in conjunction with other components. For some parts which have been described in the above embodiments, the description thereof is omitted here for brevity.

At block 312, the first NF may terminate a subscription of the at least one event type. For example, when the first NF receives the event notification response comprising error information from the third NF, it may terminate the subscription of the at least one event type.

At block 314, the first NF may clean up at least one resource reserved for the subscription of the at least one event type. For example, when the first NF receives the event notification response comprising error information from the third NF, it may clean up at least one resource reserved for the subscription of the at least one event type.

Figure 4:
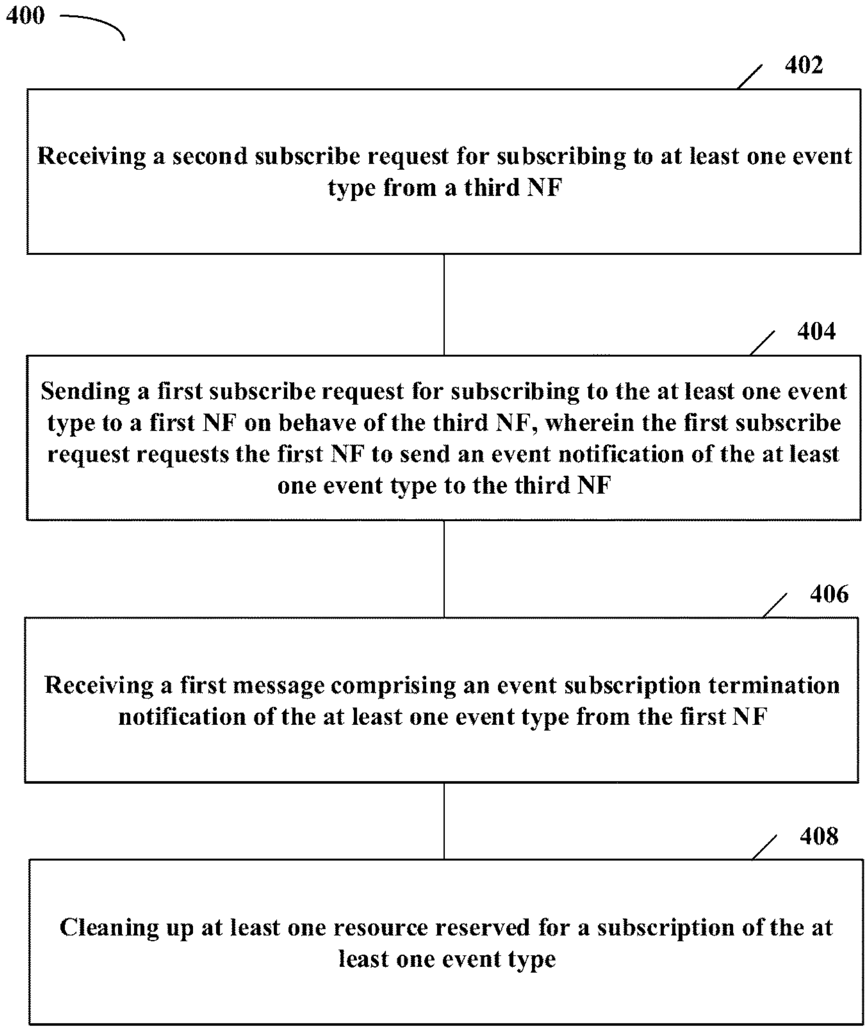
FIG. 4 shows a flowchart of a method according to another embodiment of the present disclosure.

FIG. 4 shows a flowchart of a method according to another embodiment of the present disclosure, which may be performed by an apparatus implemented in or at or as a second NF or communicatively coupled to the second NF. As such, the apparatus may provide means or modules for accomplishing various parts of the method 400 as well as means or modules for accomplishing other processes in conjunction with other components. For some parts which have been described in the above embodiments, the description thereof is omitted here for brevity.

At block 402, the second NF may receive a second subscribe request for subscribing to at least one event type from a third NF.

In an embodiment, the second NF comprises a unified data management (UDM).

In an embodiment, the third NF comprises a network exposure function (NEF).

The second subscribe request may be any suitable subscribe request such as exiting subscribe request or new subscribe request.

In an embodiment, the second subscribe request may be the subscribe request as described in 3GPP TS 23.502 V17.5.0. For example, the second subscribe request may be Nudm_EventExposure_Subscribe request as described in 3GPP TS 23.502 V17.5.0.

The at least one event type may be any suitable event type and the present disclosure has no limit on it. In an embodiment, the at least one event type may be same as the event type as described in various 3GPP specifications such as 3GPP TS 23.502 V17.5.0. For example, the at least one event type may comprise PDU Session Release, UE mobility out of an Area of Interest, etc.

At block 404, the second NF may send a first subscribe request for subscribing to the at least one event type to a first NF on behave of the third NF. The first subscribe request requests the first NF to send an event notification of the at least one event type to the third NF.

In an embodiment, the first NF comprises at least one of an access and mobility management function (AMF), or a session management function (SMF).

At block 406, the second NF may receive a first message comprising an event subscription termination notification of the at least one event type from the first NF.

For example, the first NF may send the first message at block 310, and then the second NF may receive the first message from the second NF.

In an embodiment, the first message further comprises a reason code.

In an embodiment, the reason code indicates that a subscription of the at least one event type is terminated because the first NF has identified that the subscription of the at least one event type is no longer valid on the third NF hosting a notification uniform resource identifier (URI).

At block 408, the second NF may clean up at least one resource reserved for a subscription of the at least one event type.

In an embodiment, the second NF may send a message comprising an event subscription termination notification of the at least one event type to the third NF.

In an embodiment, the message may further comprise a reason code.

In an embodiment, the reason code may indicate that a subscription of the at least one event type is terminated because the first NF has identified that the subscription of the at least one event type is no longer valid on the third NF hosting a notification uniform resource identifier (URI).

Figure 5:
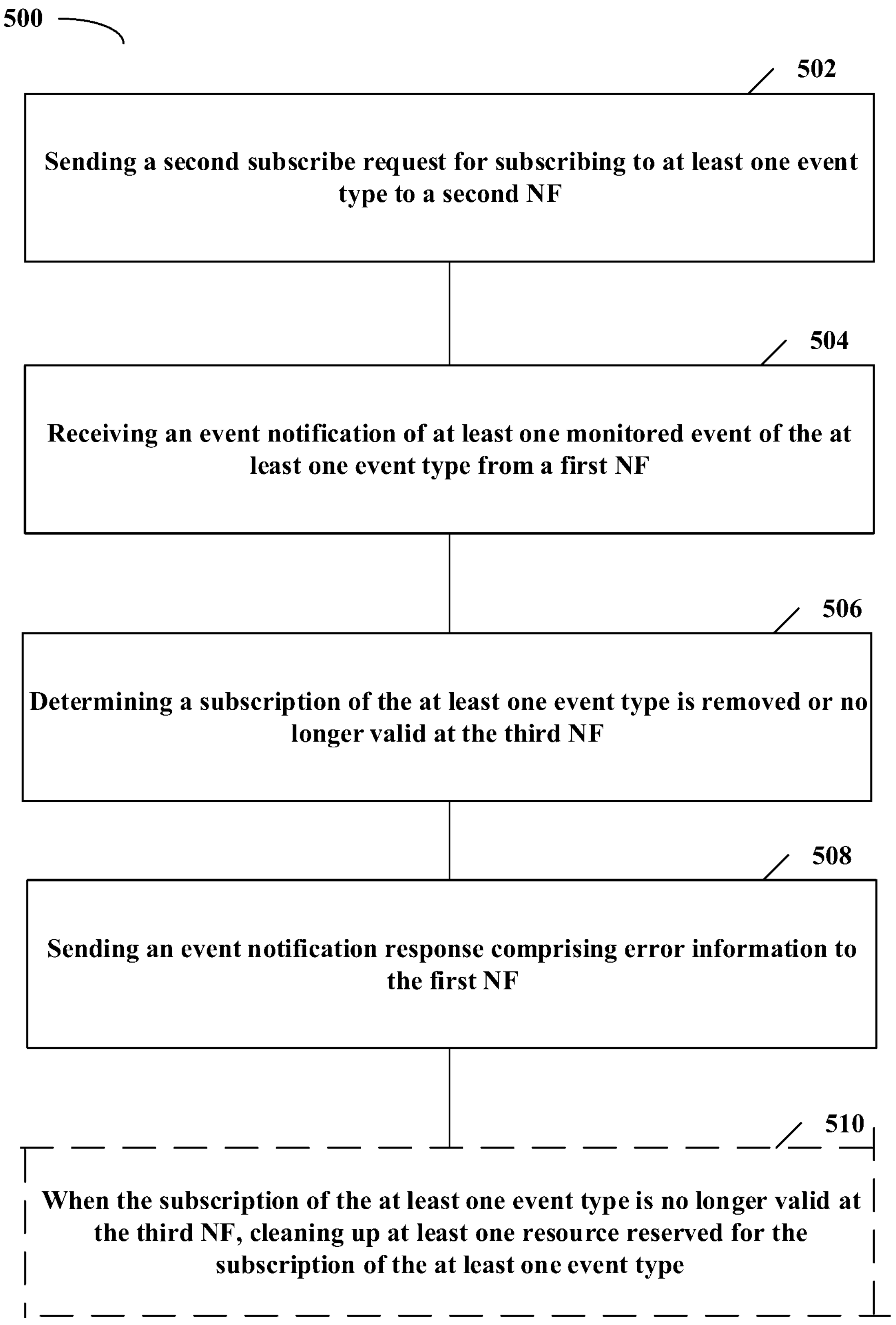
FIG. 5 shows a flowchart of a method according to another embodiment of the present disclosure.

FIG. 5 shows a flowchart of a method according to another embodiment of the present disclosure, which may be performed by an apparatus implemented in or at or as a third NF or communicatively coupled to the third NF. As such, the apparatus may provide means or modules for accomplishing various parts of the method 500 as well as means or modules for accomplishing other processes in conjunction with other components. For some parts which have been described in the above embodiments, the description thereof is omitted here for brevity.

At block 502, the third NF may send a second subscribe request for subscribing to at least one event type to a second NF.

In an embodiment, the second NF comprises a unified data management (UDM).

In an embodiment, the third NF comprises a network exposure function (NEF).

At block 504, the third NF may receive an event notification of at least one monitored event of the at least one event type from a first NF.

In an embodiment, the first NF comprises at least one of an access and mobility management function (AMF), or a session management function (SMF).

At block 506, the third NF may determine a subscription of the at least one event type is removed or no longer valid at the third NF. For example, the subscription of the at least one event type may be removed or no longer valid at the third NF due to various reasons, for example, the third NF is restarted, software error, storage error, etc.

At block 508, the third NF may send an event notification response comprising error information to the first NF.

At block 510, optionally, when the subscription of the at least one event type is no longer valid at the third NF, the third NF may clean up at least one resource reserved for the subscription of the at least one event type.

In an embodiment, the third NF may receive a message comprising an event subscription termination notification of the at least one event type from the second NF. And then the third NF may clean up at least one resource reserved for the subscription of the at least one event type.

Figure 6A:
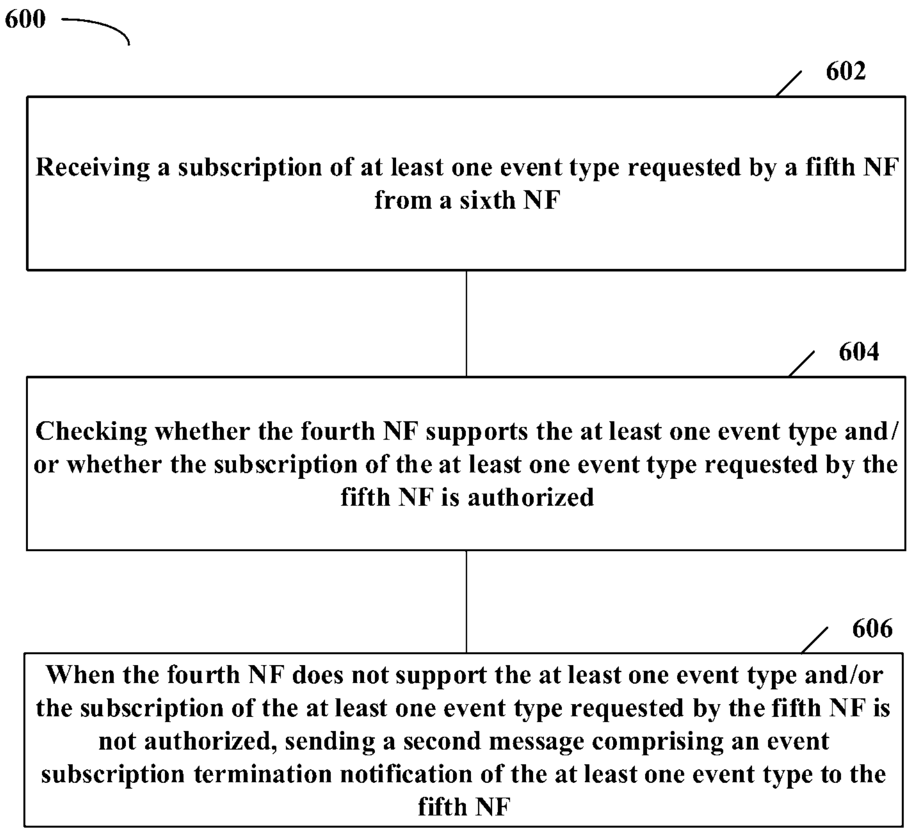
FIG. 6*a* shows a flowchart of a method according to another embodiment of the present disclosure.

FIG. 6*a* shows a flowchart of a method according to another embodiment of the present disclosure, which may be performed by an apparatus implemented in or at or as a fourth NF or communicatively coupled to the fourth NF. As such, the apparatus may provide means or modules for accomplishing various parts of the method 600 as well as means or modules for accomplishing other processes in conjunction with other components. For some parts which have been described in the above embodiments, the description thereof is omitted here for brevity.

At block 602, the fourth NF may receive a subscription of at least one event type requested by a fifth NF from a sixth NF.

The fourth NF may be any suitable network device or node or entity or function. For example, the fourth NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the fourth NF may comprise at least one of an access and mobility management function (AMF), or a session management function (SMF).

The fifth NF may be any suitable network device or node or entity or function. For example, the fifth NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the fifth NF may comprise a unified data management (UDM) or a network exposure function (NEF).

The sixth NF may be any suitable network device or node or entity or function. For example, the sixth NF may be any of NFs (e.g., AUSF, AMF, NEF, NRF, NSSF, PCF, SMF, UDM, UPF, AF, SCP, NSACF, EASDF) as described in various 3GPP specifications such as 3GPP TS 23.501 V17.5.0.

In an embodiment, the sixth NF may comprise at least one of an access and mobility management function (AMF), or a session management function (SMF)).

The fourth NF may receive the subscription of at least one event type requested by the fifth NF from the sixth NF in various ways. For example, the fourth NF may send a request for obtaining the subscription of at least one event type requested by the fifth NF to the sixth NF and then the fourth NF may receive the subscription of at least one event type requested by the fifth NF from the sixth NF.

For example, a UE may be served by the sixth NF such as AMF which stores the subscription of at least one event type requested by the fifth NF such as UDM or NEF. Due to the UE mobility, the fourth NF such as AMF may serve the UE and send a UE context transfer request to the sixth NF. And then the fourth NF may receive a UE context transfer response comprising the subscription of at least one event type requested by the fifth NF from the sixth NF.

In an embodiment, the subscription of the at least one event type requested by the fifth NF may be received from the sixth NF during an inter public land mobile network (PLMN) mobility procedure or a terminal device mobility procedure.

At block 604, the fourth NF may check whether the fourth NF supports the at least one event type and/or whether the subscription of the at least one event type requested by the fifth NF is authorized.

For example, the fourth NF may check whether it supports the event type of the transferred subscription and whether the received subscription is authorized, based authorization policy in the fourth NF or its PLMN. For example, authorization in sixth NF and its PLMN may be different to the one of the fourth NF and its PLMN.

At block 606, when the fourth NF does not support the at least one event type and/or the subscription of the at least one event type requested by the fifth NF is not authorized, the fourth NF may send a second message comprising an event subscription termination notification of the at least one event type to the fifth NF.

The second message may be any suitable message such as existing message or new message.

The event subscription termination notification may be any suitable form such as a bit, a flag, an indication, etc.

In an embodiment, the second message may further comprise a reason code. The reason code may be any suitable form such as a bit, a flag, an indication, etc.

In an embodiment, the reason code may indicate at least one of the subscription of the at least one event type is terminated because a service access authorization to the fifth NF is no longer valid, the subscription of the at least one event type is terminated because the fourth NF requires a new service authorization, or the subscription of the at least one event type is terminated because the at least one event type is not supported in the fourth NF.

Figure 6B:
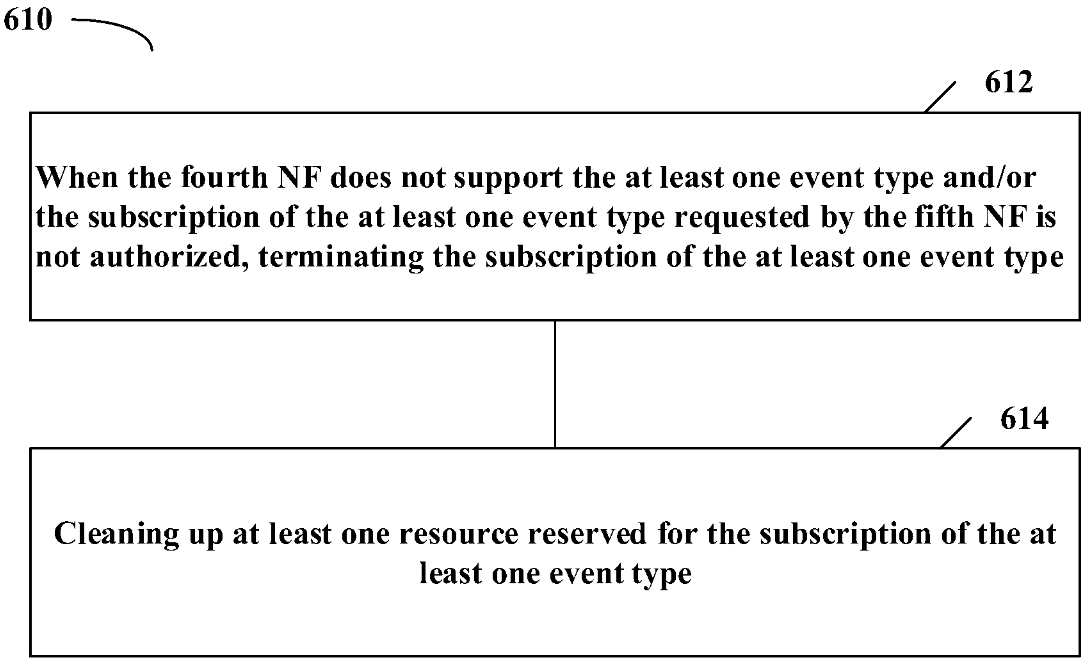
FIG. 6*b* shows a flowchart of a method according to another embodiment of the present disclosure.

FIG. 6*b* shows a flowchart of a method according to another embodiment of the present disclosure, which may be performed by an apparatus implemented in or at or as a fourth NF or communicatively coupled to the fourth NF. As such, the apparatus may provide means or modules for accomplishing various parts of the method 610 as well as means or modules for accomplishing other processes in conjunction with other components. For some parts which have been described in the above embodiments, the description thereof is omitted here for brevity.

At block 612, when the fourth NF does not support the at least one event type and/or the subscription of the at least one event type requested by the fifth NF is not authorized, the fourth NF may terminate the subscription of the at least one event type.

At block 614, the fourth NF may clean up at least one resource reserved for the subscription of the at least one event type.

Figure 7A:
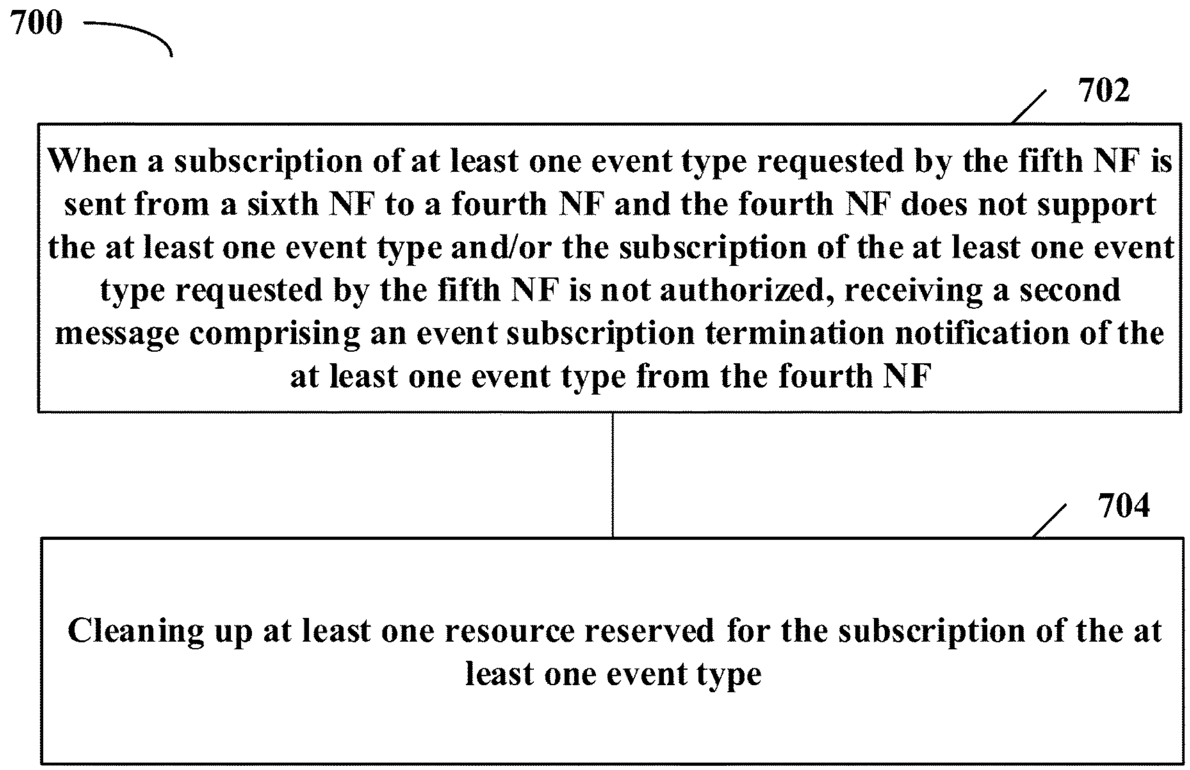
FIG. 7*a* shows a flowchart of a method according to another embodiment of the present disclosure.

FIG. 7*a* shows a flowchart of a method according to another embodiment of the present disclosure, which may be performed by an apparatus implemented in or at or as a fifth NF or communicatively coupled to the fifth NF. As such, the apparatus may provide means or modules for accomplishing various parts of the method 700 as well as means or modules for accomplishing other processes in conjunction with other components. For some parts which have been described in the above embodiments, the description thereof is omitted here for brevity.

At block 702, when a subscription of at least one event type requested by the fifth NF is sent from a sixth NF to a fourth NF and the fourth NF does not support the at least one event type and/or the subscription of the at least one event type requested by the fifth NF is not authorized, the fifth NF may receive a second message comprising an event subscription termination notification of the at least one event type from the fourth NF.

In an embodiment, the fourth NF comprises at least one of an access and mobility management function (AMF), or a session management function (SMF).

In an embodiment, the fifth NF comprises at least one of a unified data management (UDM), or a network exposure function (NEF).

In an embodiment, the sixth NF comprises at least one of an access and mobility management function (AMF), or a session management function (SMF).

For example, the fifth NF can send a subscribe request for subscribing to the at least one event type to the sixth NF directly. The fifth NF can send a subscribe request for subscribing to the at least one event type to an NF which may send a subscribe request for subscribing to the at least one event type to the sixth NF on behave of the third NF. In these cases, the sixth NF may create the subscription of at least one event type requested by the fifth NF.

As another example, the sixth NF may obtain the subscription of at least one event type requested by the fifth NF from another NF.

In an embodiment, the second message further comprises a reason code.

In an embodiment, the reason code indicates at least one of the subscription of the at least one event type is terminated because a service access authorization to the fifth NF is no longer valid, the subscription of the at least one event type is terminated because the fourth NF requires a new service authorization, or the subscription of the at least one event type is terminated because the at least one event type is not supported in the fourth NF.

In an embodiment, the subscription of the at least one event type requested by the fifth NF is sent from the sixth NF to the fourth NF during an inter public land mobile network (PLMN) mobility procedure or a terminal device mobility procedure.

At block 704, the fifth NF may clean up at least one resource reserved for the subscription of the at least one event type.

Figure 7B:
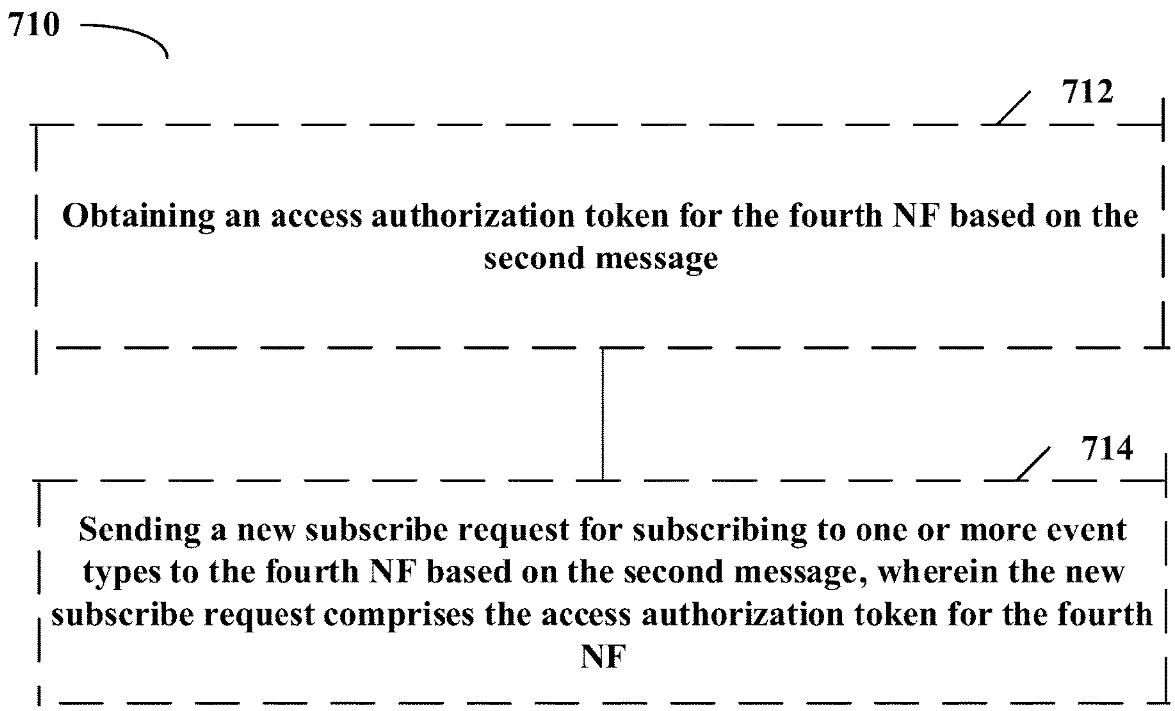
FIG. 7*b* shows a flowchart of a method according to another embodiment of the present disclosure.

FIG. 7*b* shows a flowchart of a method according to another embodiment of the present disclosure, which may be performed by an apparatus implemented in or at or as a fifth NF or communicatively coupled to the fifth NF. As such, the apparatus may provide means or modules for accomplishing various parts of the method 710 as well as means or modules for accomplishing other processes in conjunction with other components. For some parts which have been described in the above embodiments, the description thereof is omitted here for brevity.

At block 712, optionally, the fifth NF may obtain an access authorization token for the fourth NF based on the second message.

For example, the fifth NF may obtain an access authorization token for the fourth NF by Nnrf_AccessToken_Get Service Operation as described in 3GPP TS 33.501 V17.7.0.

For example, when the second message comprises a reason code indicating at least one of the subscription of the at least one event type is terminated because a service access authorization to the fifth NF is no longer valid, or the subscription of the at least one event type is terminated because the fourth NF requires a new service authorization, or the subscription of the at least one event type is terminated because the at least one event type is not supported in the fourth NF, the fifth NF may obtain an access authorization token for the fourth NF based on the second message.

At block 714, optionally, the fifth NF may send a new subscribe request for subscribing to one or more event types to the fourth NF based on the second message. The new subscribe request comprises the access authorization token for the fourth NF.

For example, when the second message comprises a reason code indicating at least one of the subscription of the at least one event type is terminated because a service access authorization to the fifth NF is no longer valid, or the subscription of the at least one event type is terminated because the fourth NF requires a new service authorization, or the subscription of the at least one event type is terminated because the at least one event type is not supported in the fourth NF, the fifth NF may send a new subscribe request for subscribing to one or more event types to the fourth NF. In an embodiment, the new subscribe request may comprise the access authorization token for the fourth NF when the access authorization token is required by the fourth NF. In another embodiment, the new subscribe request may not comprise the access authorization token for the fourth NF when the access authorization token is not required by the fourth NF.

Figure 7C:
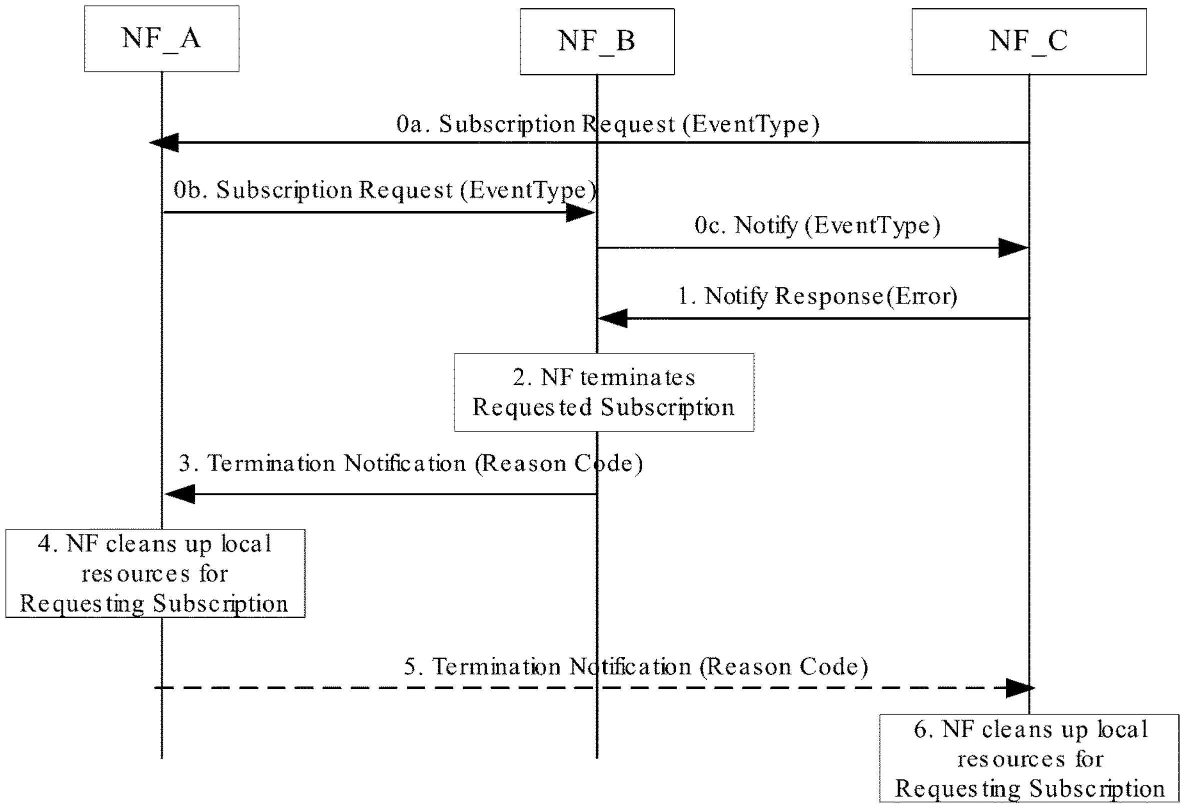
FIG. 7*c* shows a flowchart of event subscription termination notification according to an embodiment of the present disclosure.

FIG. 7*c* shows a flowchart of event subscription termination notification according to an embodiment of the present disclosure.

At step 0. The NF service consumer NF_A requests a subscription for an event type towards NF service producer NF_B on behave of NF service consumer NF_C, following the procedure defined in 3GPP TS 23.501 V17.5.0 or 3GPP TS 23.502 V17.5.0. Upon success, NF_B sends the even notifications of the subscribed event type to NF_C.

At step 1. Some events happen e.g. the original event subscription maybe locally removed or no longer valid at the NF service consumer (NF_C). Upon receiving Notification of the subscribed event type, NF_C sends a response with error code.

At step 2. Upon receiving such response with error, NF_B determines to terminate the subscription and cleans up the resource reserved for the received subscription. If the subscribed event is requested by NF_A on behave of NF_C, NF_B sends a new Event type "Event Subscription Termination Notification" to the subscription request NF_A, optional with reason code. Table 1 shows an example of reason code.

TABLE 1

| | |
|---|---|
| "INVALID_SUBSCRIPTION" | Indicates that the subscription is terminated because the AMF has identified that the subscription is no longer valid on the NF hosting the notification URI. |

At step 4. The NF_A, upon receiving Event Subscription Termination Notification, cleans up the resource reserved for the subscription as requested in step 0.

At step 5. Optionally, if the subscribed event is originally requested by NF_C and handled by NF_A on behave of NF_C, the NF_A may send Event type "Event Subscription Termination Notification" to the NF_C, optional with the reason code.

At step 6. Optionally, the NF_C, upon receiving Event Subscription Termination Notification, cleans up the resource reserved for the subscribed event.

Figure 7D:
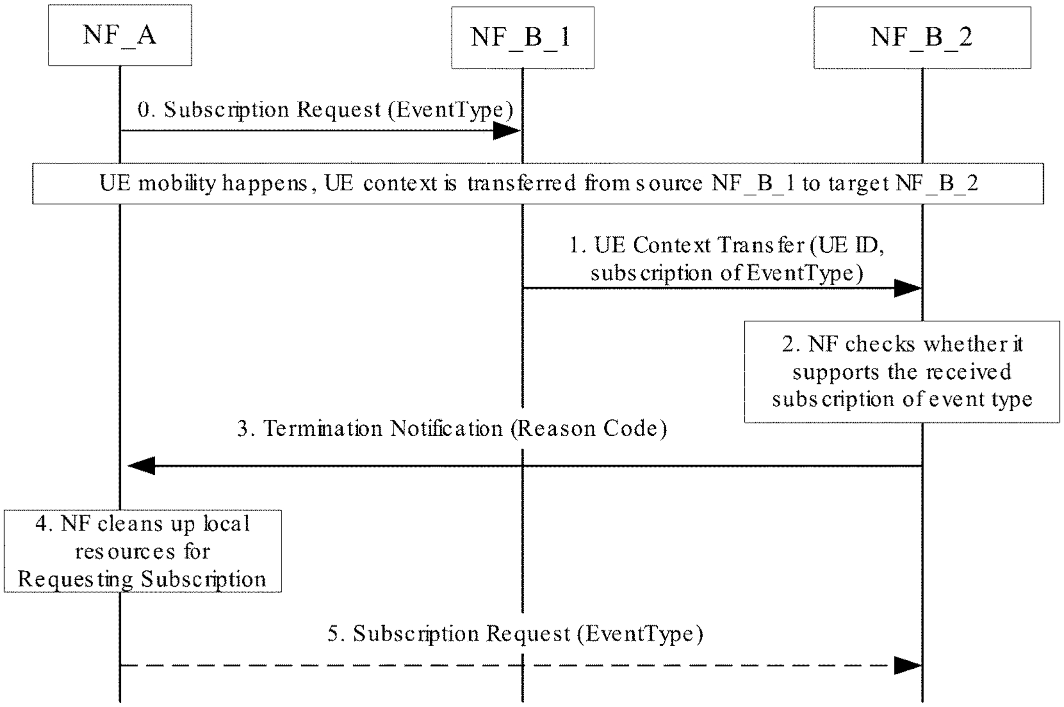
FIG. 7*d* shows a flowchart of event subscription termination notification according to another embodiment of the present disclosure.

FIG. 7*d* shows a flowchart of event subscription termination notification according to another embodiment of the present disclosure.

At step 0. The NF service consumer NF_A requests a subscription for an event type towards NF service producer NF_B_1. NF_B_1 authorizes the request and subscription is created. The even notifications of the subscribed event type are sent to NF_A, following the procedure defined in 3GPP TS 23.501 V17.5.0 or 3GPP TS 23.502 V17.5.0.

At step 1. Some events happen e.g. UE mobility, and UE context for the UE is transferred, including the subscription created at step 1, from NF_B_1 to NF_B_2.

At step 2. Along with other UE context transfer related activities, NF_B_2 checks whether it supports the event type of the transferred subscription and whether the received subscription is authorized, based authorization policy in NF_B_2 or its PLMN. For example, authorization in NF_B_1 and its PLMN may be different to the one of NF_B_2 and its PLMN.

At step 3. If the check of step 2 fails, NF_B_2 determines to terminate the subscription and cleans up the resource reserved for the received subscription. NF_B_2 sends a new Event type Notification e.g. "Event Subscription Termination Notification" to the subscription request NF_A, optional with reason code. Table 2 shows an example of reason code.

5.3.2.4.1 General

The Notify service operation is invoked by the AMF, to send a notification, towards the notification URI, when certain event included in the subscription has taken place.

The AMF shall use the HTTP method POST, using the notification URI received in the subscription creation as specified in clause 5.3.2.2.2 of 3GPP TS 29.518 V17.7.0, including e.g. the subscription ID, Event ID(s) for which event has happened, notification correlation ID provided by the NF service consumer at the time of event subscription, to send a notification.

Additionally, the Notify service operation shall also be invoked by the AMF, when there is a change of AMF during UE mobility procedures and if the subscription Id changes (i.e. Registration procedures and Handover procedures) or the subscription is terminated by the AMF.

Figure 7E:
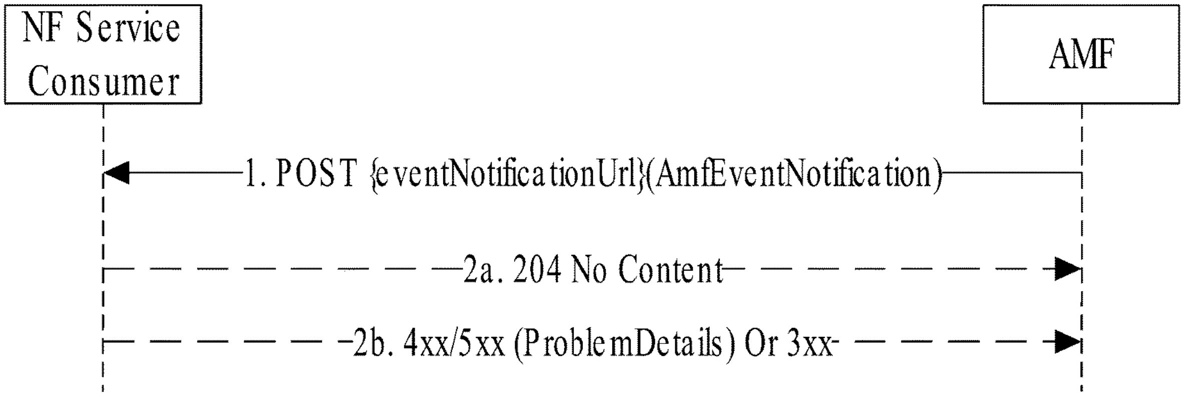
FIG. 7*e* shows a flowchart of notify according to an embodiment of the present disclosure.
Figure 8A:
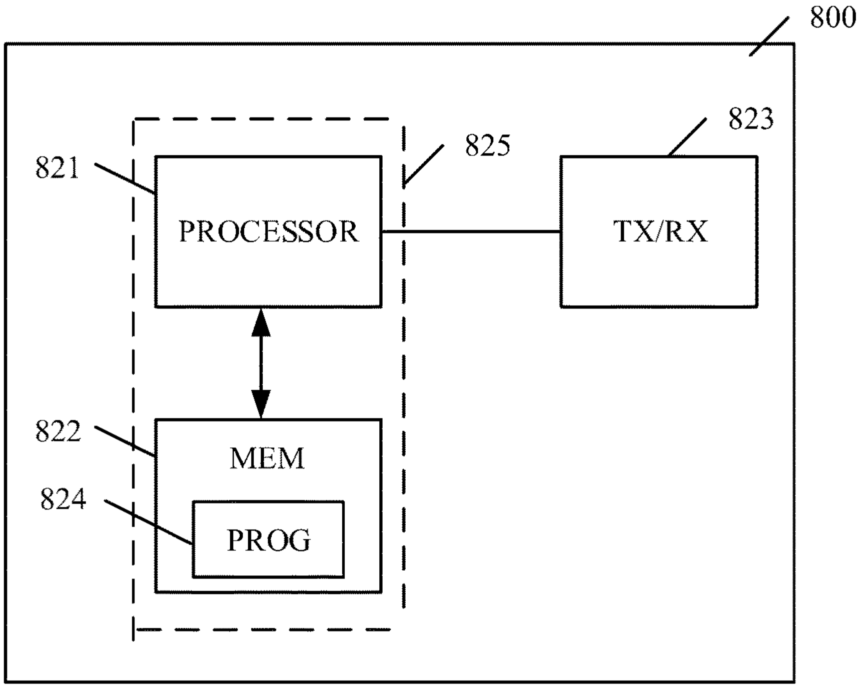
FIG. 8*a* is a block diagram showing an apparatus suitable for practicing some embodiments of the disclosure.
Figure 8B:
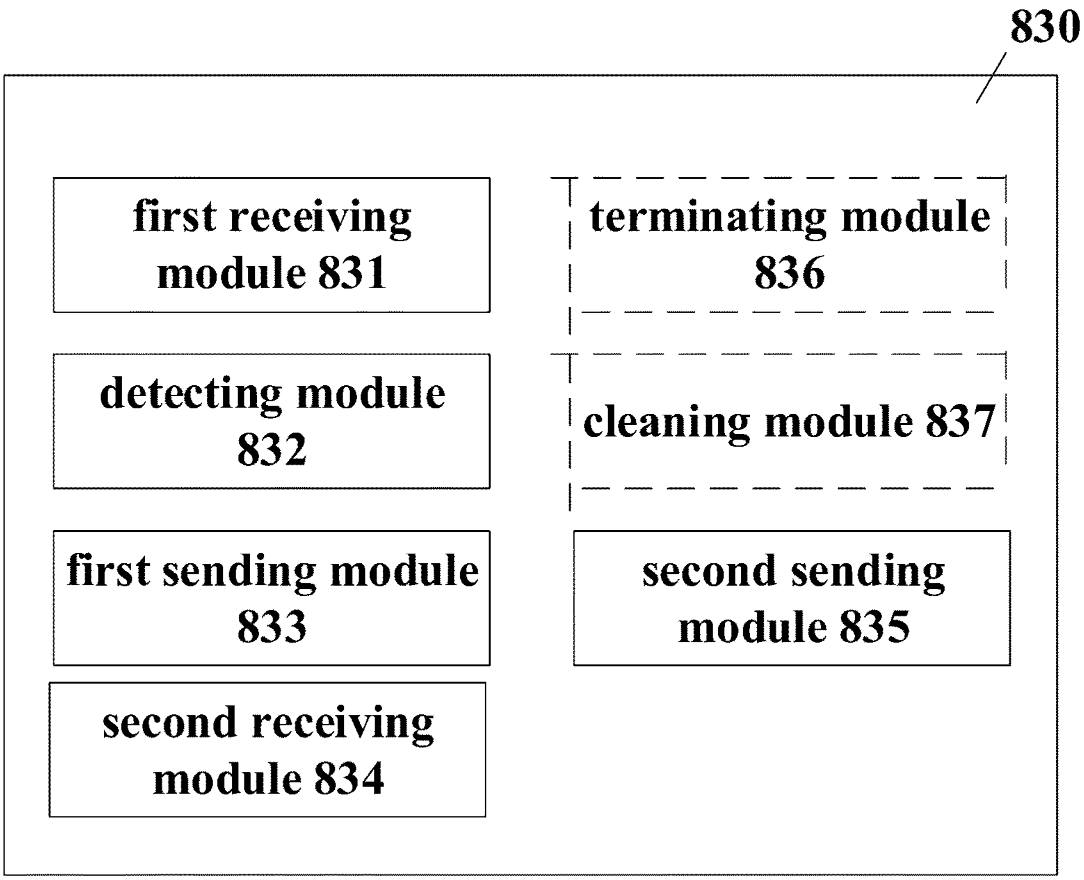
FIG. 8*b* is a block diagram showing a first NF according to an embodiment of the disclosure.
Figure 8C:
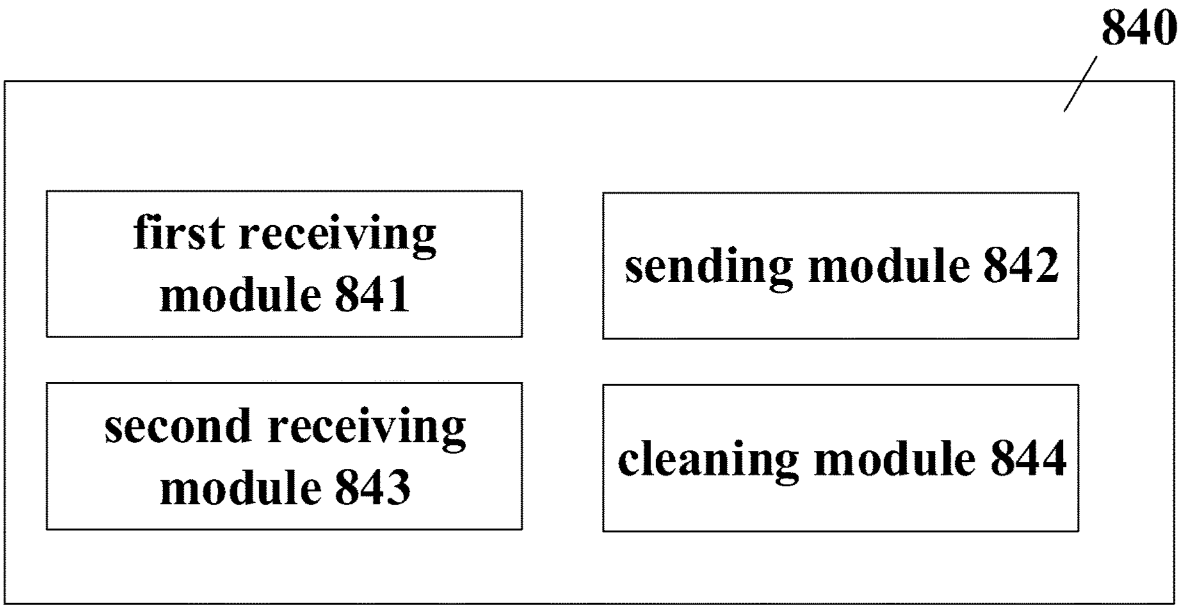
FIG. 8*c* is a block diagram showing a second NF according to an embodiment of the disclosure.
Figure 8D:
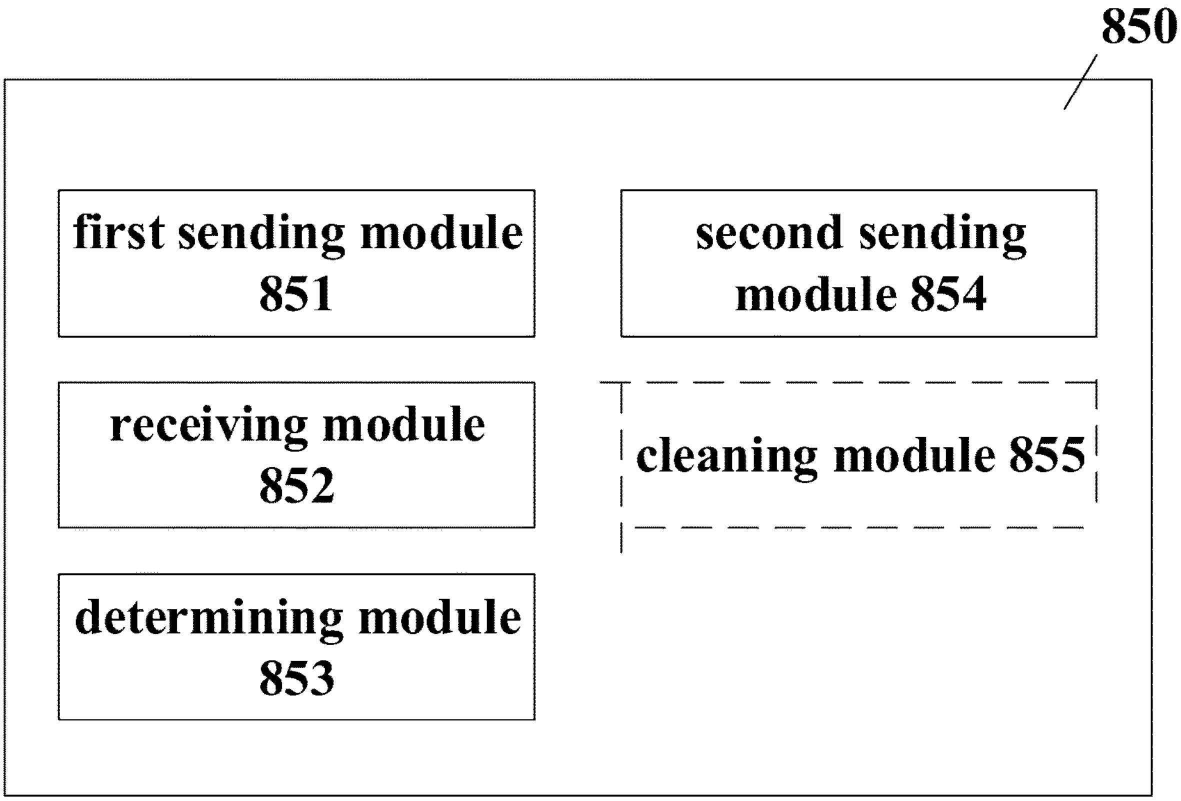
FIG. 8*d* is a block diagram showing a third NF according to an embodiment of the disclosure.
Figure 8E:
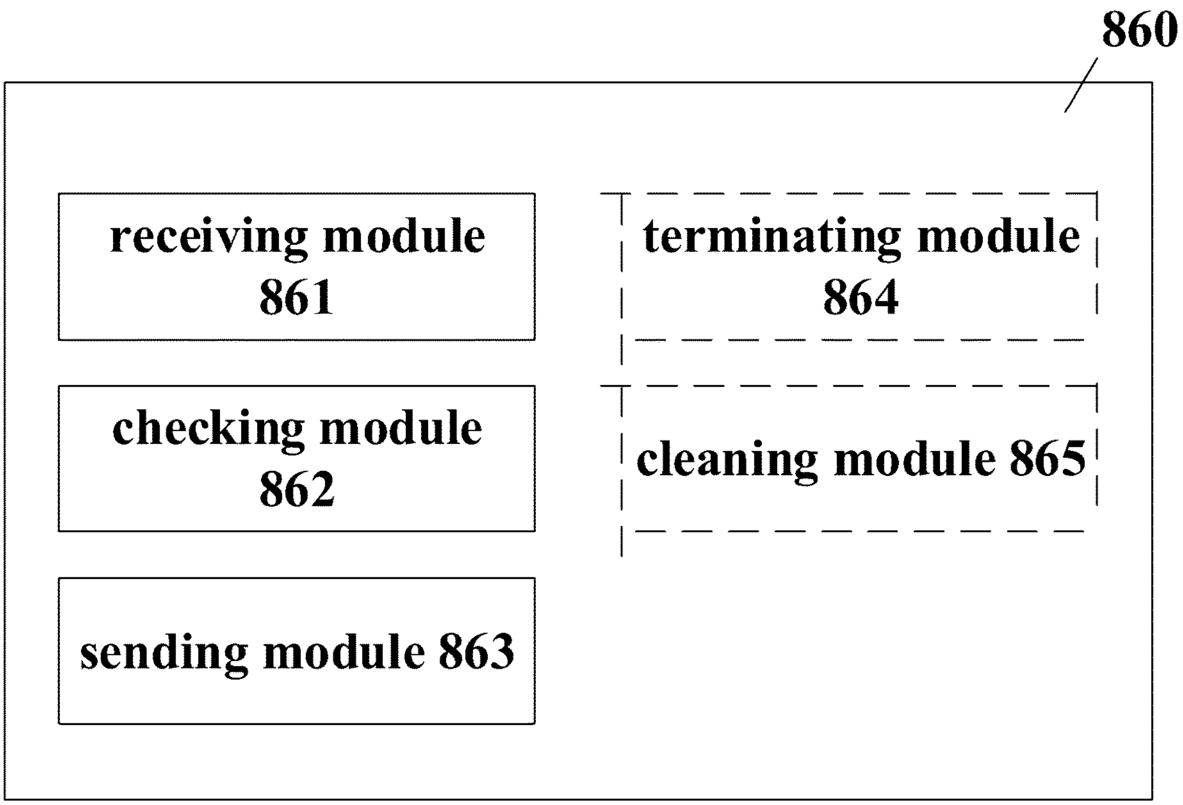
FIG. 8*e* is a block diagram showing a fourth NF according to an embodiment of the disclosure.
Figure 8F:
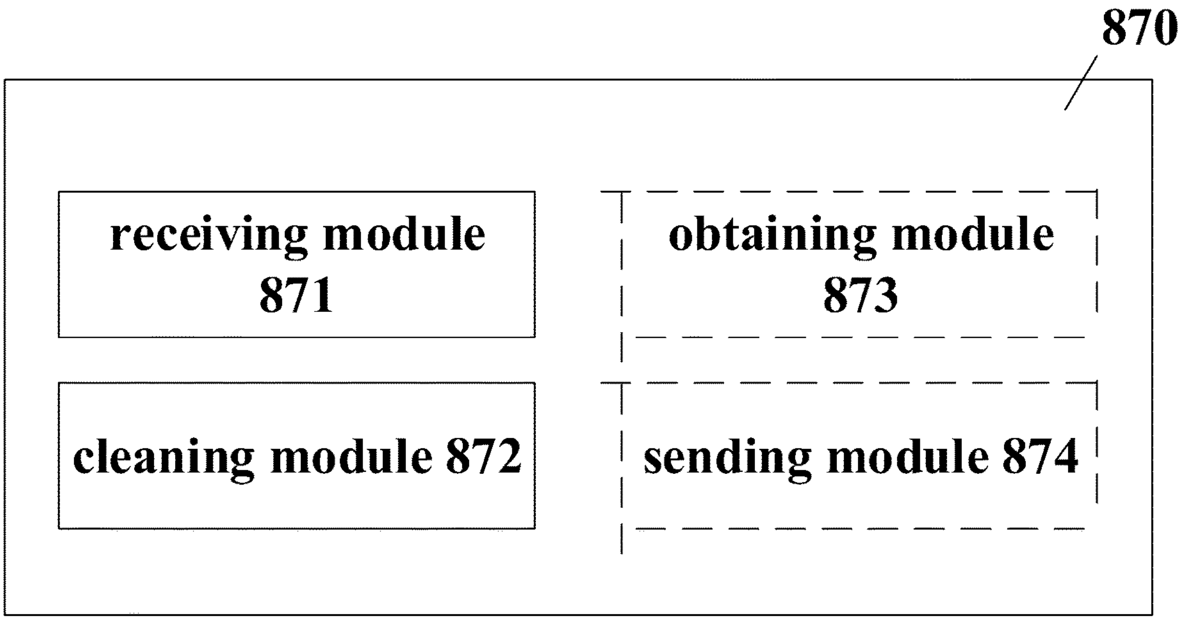
FIG. 8*f* is a block diagram showing a fifth NF according to an embodiment of the disclosure.

FIG. 7*e* shows a flowchart of notify according to an embodiment of the present disclosure.

1. The AMF shall send a POST request to send a notification.

2a. On success, "204 No content" shall be returned by the NF service consumer.

2b. On failure or redirection, the appropriate HTTP status code (e.g. "403 Forbidden") indicating the error shall be returned and appropriate additional error information should be returned.

When the AMF received the following response code (and application error), the AMF should consider the subscription is no longer valid and terminate the subscription:

"400 Bad Request" with application error "RESOURCE_CONTEXT_NOT_FOUND"

"404 Not Found"

TABLE 2

| | |
|---|---|
| "INVALID_AUTHORIZATION" | Indicates that the subscription is terminated because the service access authorization to the NF consumer is no longer valid. e.g. target AMF/PLMN requires new service authorization after inter-PLMN mobility. |
| "UNSUPPORTED_EVENT" | Indicates that the subscription is terminated because the subscribed event type is not supported in the NF producer. e.g. target AMF/PLMN does have capability to support the event type after inter-PLMN mobility. |

If the reason code suggests NF_A may take further action, NF_B_2 may include assistance information in the message for further actions in NF_A, e.g. NF ID, address, and URL (uniform resource locator) of NF_B_2 which may be used to receive new subscription from NF_A.

At step 4. The NF_A, upon receiving Event Subscription Termination Notification, cleans up the resource reserved for the subscription as requested in step 0.

At step 5. If the reason code suggests NF_A may take further action, NF_A may send a new subscription request for the event type towards NF producer_B_2, possibly based on the assistance information received in step 3.

In an embodiment, NF_A may obtain an access authorization token for the NF_B_2 and the new subscription request may comprise the access authorization token.

In an embodiment, clause 5.3.2.4.1 of 3GPP TS 29.518 V17.7.0 may be amended as following.

When the AMF terminates the subscription upon above response codes and if the subscription is done by the NF consumer on behalf of another NF (e.g. the UDM subscribes to the AMF on behalf of the NEF), the AMF shall send a notification to the NF consumer (e.g. the UDM) to inform the termination of the subscription.

In an embodiment, the following data type "SubTerminationReason" may be added in Table 6.2.6.1-1 of 3GPP TS 29.518 V17.7.0.

TABLE 6.2.6.1-1

| Namf_EventExposure specific Data Types | | |
|---|---|---|
| Data type | Clause defined | Description |
| SubTerminationReason | 6.2.6.3.xx | Subscription Termination Reason |

In an embodiment, the following attribute name "termReason" may be added in Table 6.2.6.2.5-1 of 3GPP TS 29.518 V17.7.0.

TABLE 6.2.6.2.5-1

| Definition of type AmfEventReport | | | | | |
|---|---|---|---|---|---|
| Attribute name | Data type | P | Cardinality | Description | Applicability |
| termReason | SubTerminationReason | O | 0 . . . 1 | This IE may be present when the event type is SUBSCRIPTION_TERMINATION.<br>When present, this IE shall indicate the reason for the subscription termination. | |

In an embodiment, the following Enumeration value "SUBSCRIPTION TERMINATION" may be added in Table 6.2.6.3.3-1 of 3GPP TS 29.518 V17.7.0.

TABLE 6.2.6.3.3-1

| Enumeration AmfEventType | |
|---|---|
| Enumeration value | Description |
| "SUBSCRIPTION_TERMINATION" | This event type is used by the AMF to inform the NF service consumer that the subscription is terminated at the AMF, e.g. the AMF inform the UDM that the subscription is terminated because the AMF has identified the subscription is no longer valid at the NEF. |

In an embodiment, the following Table 6.2.6.3.x-1 may be added in of 3GPP TS 29.518 V17.7.0.

TABLE 6.2.6.3.x-1

| Enumeration SubTerminationReason | |
|---|---|
| Enumeration value | Description |
| "INVALID_SUBSCRIPTION" | Indicates that the subscription is terminated because the AMF has identified that the subscription is no longer valid on the NF hosting the notification URI. |
| "INVALID_AUTHORIZATION" | Indicates that the subscription is terminated because the service access authorization to the NF consumer is no longer valid. e.g. target AMF/PLMN requires new service authorization after inter-PLMN mobility. |

In an embodiment, Namf_EventExposure API of 3GPP TS 29.518 V17.7.0 may be amended as following.

A.3 Namf_EventExposure API

```
********************** Text Skipped for Clarity ***********************
  AmfEventReport:
    description: Represents a report triggered by a subscribed event type
    type: object
    properties:
      type:
        $ref: '#/components/schemas/AmfEventType'
      state:
        $ref: '#/components/schemas/AmfEventState'
      timeStamp:
        $ref: 'TS29571_CommonData.yaml#/components/schemas/DateTime'
      subscriptionId:
        $ref: 'TS29571_CommonData.yaml#/components/schemas/Uri'
      anyUe:
        type: boolean
      supi:
        $ref: 'TS29571_CommonData.yaml#/components/schemas/Supi'
      areaList:
        type: array
        items:
          $ref: '#/components/schemas/AmfEventArea'
        minItems: 1
```

```
refId:
  $ref: 'TS29503_Nudm_EE.yaml#/components/schemas/ReferenceId'
gpsi:
  $ref: 'TS29571_CommonData.yaml#/components/schemas/Gpsi'
pei:
  $ref: 'TS29571_CommonData.yaml#/components/schemas/Pei'
location:
  $ref: 'TS29571_CommonData.yaml#/components/schemas/UserLocation'
additionalLocation:
  $ref: 'TS29571_CommonData.yaml#/components/schemas/UserLocation'
timezone:
  $ref: 'TS29571_CommonData.yaml#/components/schemas/TimeZone'
accessTypeList:
  type: array
  items:
    $ref: 'TS29571_CommonData.yaml#/components/schemas/AccessType'
  minItems: 1
rmInfoList:
  type: array
  items:
    $ref: '#/components/schemas/RmInfo'
  minItems: 1
cmInfoList:
  type: array
  items:
    $ref: '#/components/schemas/CmInfo'
  minItems: 1
reachability:
  $ref: '#/components/schemas/UeReachability'
commFailure:
  $ref: '#/components/schemas/CommunicationFailure'
lossOfConnectReason:
  $ref: '#/components/schemas/LossOfConnectivityReason'
numberOfUes:
  type: integer
5gsUserStateList:
  type: array
  items:
    $ref: '#/components/schemas/5GsUserStateInfo'
  minItems: 1
typeCode:
  type: string
  pattern: '^imeitac-[0-9]{8}$'
registrationNumber:
  type: integer
maxAvailabilityTime:
  $ref: 'TS29571_CommonData.yaml#/components/schemas/DateTime'
ueIdExt:
  type: array
  items:
    $ref: '#/components/schemas/UEIdExt'
  minItems: 1
snssaiTaiList:
  type: array
  items:
    $ref: '#/components/schemas/SnssaiTaiMapping'
  minItems: 1
idleStatusIndication:
  $ref: '#/components/schemas/IdleStatusIndication'
ueAccessBehaviorTrends:
  type: array
  items:
    $ref: '#/components/schemas/UeAccessBehaviorReportItem'
  minItems: 1
ueLocationTrends:
  type: array
  items:
    $ref: '#/components/schemas/UeLocationTrendsReportItem'
  minItems: 1
mmTransLocationReportList:
  type: array
  items:
    $ref: '#/components/schemas/MmTransactionLocationReportItem'
  minItems: 1
```

-continued

```
        mmTransSliceReportList:
          type: array
          items:
            $ref: '#/components/schemas/MmTransactionSliceReportItem'
          minItems: 1
        termReason:
SubTerminationReason'    required:
        - type
        - state
        - timeStamp
********************** Text Skipped for Clarity ************************
    AmfEventType:
      description: Describes the supported event types of Namf_EventExposure Service
      anyOf:
      - type: string
        enum:
          - LOCATION_REPORT
          - PRESENCE_IN_AOI_REPORT
          - TIMEZONE_REPORT
          - ACCESS_TYPE_REPORT
          - REGISTRATION_STATE_REPORT
          - CONNECTIVITY_STATE_REPORT
          - REACHABILITY_REPORT
          - COMMUNICATION_FAILURE_REPORT
          - UES_IN_AREA_REPORT
          - SUBSCRIPTION_ID_CHANGE
          - SUBSCRIPTION_ID_ADDITION
          - SUBSCRIPTION_TERMINATION
          - LOSS_OF_CONNECTIVITY
          - 5GS_USER_STATE_REPORT
          - AVAILABILITY_AFTER_DDN_FAILURE
          - TYPE_ALLOCATION_CODE_REPORT
          - FREQUENT_MOBILITY_REGISTRATION_REPORT
          - SNSSAI_TA_MAPPING_REPORT
          - UE_LOCATION_TRENDS
          - UE_ACCESS_BEHAVIOR_TRENDS
          - UE_MM_TRANSACTION_REPORT
      - type: string
********************** Text Skipped for Clarity ************************
    AccessStateTransitionType:
      description: Access State Transition Type.
      anyOf:
      - type: string
        enum:
          - ACCESS_TYPE_CHANGE_3GPP
          - ACCESS_TYPE_CHANGE_N3GPP
          - RM_STATE_CHANGE_DEREGISTERED
          - RM_STATE_CHANGE_REGISTERED
          - CM_STATE_CHANGE_IDLE
          - CM_STATE_CHANGE_CONNECTED
          - HANDOVER
          - MOBILITY_REGISTRATION_UPDATE
      - type: string
    SubTerminationReason:
      description: Subscription Termination Reason.
      anyOf:
      - type: string
        enum:
          - INVALID_SUBSCRIPTION
          - INVALID_AUTHORIZATION
      - type: string
```

In an embodiment, the NF producer (NF_B, e.g. AMF) supports to send a new Event Subscription Termination Notification which is used to inform the subscription requester NF (NF_A, e.g. UDM) that the subscription is terminated at the NF producer.

In an embodiment, the Subscription requester (NF_A) can trigger some local cleanup for the invalid subscription based on the NF producer (NF_B) notification.

In an embodiment, an event subscription was subscribed by a NF consumer (NF_A) on behalf of another NF (NF_C) handling the notification. When the NF_A receives Event Subscription Termination Notification from the NF producer (NF_B), the NF_A sends the Event Subscription Termination Notification also to another NF (NF_C).

Embodiments herein may provide many advantages, of which a non-exhaustive list of examples follows. In some embodiments herein, based on the new Event Subscription Termination Notification, subscription requester can trigger local cleanup for the invalid subscription so as to avoid unnecessary waste of the resource usage or trigger other necessary actions to ensure service proceeding. The embodiments herein are not limited to the features and advantages mentioned above. A person skilled in the art will recognize additional features and advantages upon reading the following detailed description.

FIG. **8*a* is a block diagram showing an apparatus suitable for practicing some embodiments of the disclosure. For example, the first NF, the second NF, the third NF, the fourth NF or the fifth NF described above may be implemented as or through the apparatus 800**.

The apparatus 800 comprises at least one processor 821, such as a digital processor (DP), and at least one memory (MEM) 822 coupled to the processor 821. The apparatus 800 may further comprise a transmitter TX and receiver RX 823 coupled to the processor 821. The MEM 822 stores a program (PROG) 824. The PROG 824 may include instructions that, when executed on the associated processor 821, enable the apparatus 800 to operate in accordance with the embodiments of the present disclosure. A combination of the at least one processor 821 and the at least one MEM 822 may form processing means 825 adapted to implement various embodiments of the present disclosure.

Various embodiments of the present disclosure may be implemented by computer program executable by one or more of the processor 821, software, firmware, hardware or in a combination thereof.

The MEM 822 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 821 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first NF, the memory 822 contains instructions executable by the processor 821, whereby the first NF operates according to any of the methods related to the first NF as described above.

In an embodiment where the apparatus is implemented as or at the second NF, the memory 822 contains instructions executable by the processor 821, whereby the second NF operates according to any of the methods related to the second NF as described above.

In an embodiment where the apparatus is implemented as or at the third NF, the memory 822 contains instructions executable by the processor 821, whereby the third NF operates according to any of the methods related to the third NF as described above.

In an embodiment where the apparatus is implemented as or at the fourth NF, the memory 822 contains instructions executable by the processor 821, whereby the fourth NF operates according to any of the methods related to the fourth NF as described above.

In an embodiment where the apparatus is implemented as or at the fifth NF, the memory 822 contains instructions executable by the processor 821, whereby the fifth NF operates according to any of the methods related to the fifth NF as described above.

FIG. **8*b* is a block diagram showing a first NF according to an embodiment of the disclosure. As shown, the first NF 830 comprises a first receiving module 831 configured to receive a first subscribe request for subscribing to at least one event type from a second NF. The first subscribe request requests the first NF to send an event notification of the at least one event type to a third NF. The first NF 830 further comprises a detecting module 832 configured to detect an occurrence of at least one monitored event of the at least one event type. The first NF 830 further comprises a first sending module 833 configured to send an event notification of the at least one monitored event of the at least one event type to the third NF. The first NF 830 further comprises a second receiving module 834 configured to receive an event notification response comprising error information from the third NF. The first NF 830 further comprises a second sending module 835** configured to send a first message comprising an event subscription termination notification of the at least one event type to the second NF.

In an embodiment, the first NF 830 further comprises a terminating module 836 configured to terminate a subscription of the at least one event type.

In an embodiment, the first NF 830 further comprises a cleaning module 837 configured to clean up at least one resource reserved for the subscription of the at least one event type.

FIG. **8*c* is a block diagram showing a second NF according to an embodiment of the disclosure. As shown, the second NF 840 comprises a first receiving module 841 configured to receive a second subscribe request for subscribing to at least one event type from a third NF. The second NF 840 further comprises a sending module 842 configured to send a first subscribe request for subscribing to the at least one event type to a first NF on behave of the third NF. The first subscribe request requests the first NF to send an event notification of the at least one event type to the third NF. The second NF 840 further comprises a second receiving module 843 configured to receive a first message comprising an event subscription termination notification of the at least one event type from the first NF. The second NF 840 further comprises a cleaning module 844** configured to clean up at least one resource reserved for a subscription of the at least one event type.

FIG. **8*d* is a block diagram showing a third NF according to an embodiment of the disclosure. As shown, the third NF 850 comprises a first sending module 851 configured to send a second subscribe request for subscribing to at least one event type to a second NF. The third NF 850 further comprises a receiving module 852 configured to receive an event notification of at least one monitored event of the at least one event type from a first NF. The third NF 850 further comprises a determining module 853 configured to determine a subscription of the at least one event type is removed or no longer valid at the third NF. The third NF 850 further comprises a second sending module 854** configured to send an event notification response comprising error information to the first NF.

In an embodiment, the third NF 850 further comprises a cleaning module 855 configured to, when the subscription of the at least one event type is no longer valid at the third NF, clean up at least one resource reserved for the subscription of the at least one event type.

FIG. **8*e* is a block diagram showing a fourth NF according to an embodiment of the disclosure. As shown, the fourth NF 860 comprises a receiving module 861 configured to receive a subscription of at least one event type requested by a fifth NF from a sixth NF. The fourth NF 860 further comprises a checking module 862 configured to check whether the fourth NF supports the at least one event type and/or whether the subscription of the at least one event type requested by the fifth NF is authorized. The fourth NF 860 further comprises a sending module 863** configured to, when the fourth NF does not support the at least one event type and/or the subscription of the at least one event type requested by the fifth NF is not authorized, send a second message comprising an event subscription termination notification of the at least one event type to the fifth NF.

In an embodiment, the fourth NF 860 further comprises a terminating module 864 configured to, when the fourth NF does not support the at least one event type and/or the subscription of the at least one event type requested by the fifth NF is not authorized, terminate the subscription of the at least one event type. The fourth NF 860 further comprises a cleaning module 865 configured to clean up at least one resource reserved for the subscription of the at least one event type.

FIG. **8*f* is a block diagram showing a fifth NF according to an embodiment of the disclosure. As shown, the fifth NF 870 comprises a receiving module 871 configured to, when a subscription of at least one event type requested by the fifth NF is sent from a sixth NF to a fourth NF and the fourth NF does not support the at least one event type and/or the subscription of the at least one event type requested by the fifth NF is not authorized, receive a second message comprising an event subscription termination notification of the at least one event type from the fourth NF. The fifth NF 870 further comprises a cleaning module 872** configured to clean up at least one resource reserved for the subscription of the at least one event type.

In an embodiment, the fifth NF 870 further comprises an obtaining module 873 configured to obtain an access authorization token for the fourth NF based on the second message.

In an embodiment, the fifth NF 870 further comprises a sending module 874 configured to send a new subscribe request for subscribing to one or more event types to the fourth NF based on the second message. The new subscribe request comprises the access authorization token for the fourth NF.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first NF, the second NF, the third NF, the fourth NF or the fifth NF may not need a fixed processor or memory, any computing resource and storage resource may be arranged from the first NF, the second NF, the third NF, the fourth NF or the fifth NF in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first network function (NF), comprising:

receiving a first subscribe request for subscribing to at least one event type from a second NF, wherein the first subscribe request requests the first NF to send an event notification of the at least one event type to a third NF;

detecting an occurrence of at least one monitored event of the at least one event type;

sending an event notification of the at least one monitored event of the at least one event type to the third NF;

receiving an event notification response comprising error information from the third NF; and sending a first message comprising an event subscription termination notification of the at least one event type to the second NF.

2. The method according to claim 1, further comprising:

terminating a subscription of the at least one event type; and cleaning up at least one resource reserved for the subscription of the at least one event type.

3. The method according to claim 1, wherein the first message further comprises a reason code.

4. The method according to claim 3, wherein the reason code indicates that a subscription of the at least one event type is terminated because the first NF has identified that the subscription of the at least one event type is no longer valid on the third NF hosting a notification uniform resource identifier (URI).

5. The method according to claim 1, wherein the first NF comprises at least one of:

an access and mobility management function (AMF), or a session management function (SMF).

6. The method according to claim 1, wherein the second NF comprises a unified data management (UDM).

7. The method according to claim 1, wherein the third NF comprises a network exposure function (NEF).

8. The method according to claim 1, the error information in the event notification response is with following response code:

400 Bad Request with application error RESOURCE_CONTEXT_NOT_FOUND; or

404 Not Found.

9. A method performed by a second network function (NF), comprising:

receiving a second subscribe request for subscribing to at least one event type from a third NF;

sending a first subscribe request for subscribing to the at least one event type to a first NF on behave of the third NF, wherein the first subscribe request requests the first NF to send an event notification of the at least one event type to the third NF;

receiving a first message comprising an event subscription termination notification of the at least one event type from the first NF; and cleaning up at least one resource reserved for a subscription of the at least one event type.

10. The method according to claim 9, wherein the first message further comprises a reason code.

11. The method according to claim 10, wherein the reason code indicates that a subscription of the at least one event type is terminated because the first NF has identified that the subscription of the at least one event type is no longer valid on the third NF hosting a notification uniform resource identifier (URI).

12. The method according to claim 9, wherein the first NF comprises at least one of:

an access and mobility management function (AMF), or a session management function (SMF).

13. The method according to claim 9, wherein the second NF comprises a unified data management (UDM).

14. The method according to claim 8, wherein the third NF comprises a network exposure function (NEF).

15. The method according to claim 9, the event subscription termination notification is sent by the first NF responsive to receiving an event notification response comprising error information from the third NF.

16. The method according to claim 15, the error information in the event notification response is with following response code:

400 Bad Request with application error RESOURCE_CONTEXT_NOT_FOUND; or

404 Not Found.

17. A method performed by a third network function (NF), comprising:

sending a second subscribe request for subscribing to at least one event type to a second NF;

receiving an event notification of at least one monitored event of the at least one event type from a first NF;

determining a subscription of the at least one event type is removed or no longer valid at the third NF; and sending an event notification response comprising error information to the first NF.

18. The method according to claim 17, further comprising:

when the subscription of the at least one event type is no longer valid at the third NF, cleaning up at least one resource reserved for the subscription of the at least one event type.

19. The method according to claim 17, wherein the first NF comprises at least one of:

an access and mobility management function (AMF), or a session management function (SMF); and/or wherein the second NF comprises a unified data management (UDM); and/or wherein the third NF comprises a network exposure function (NEF).

20. The method according to claim 17, the error information in the event notification response is with following response code:

400 Bad Request with application error RESOURCE_CONTEXT_NOT_FOUND; or

404 Not Found.

* * * * *